US005898422A

United States Patent [19]
Zetts

[11] Patent Number: 5,898,422
[45] Date of Patent: Apr. 27, 1999

[54] METHOD AND SYSTEM FOR RECOGNITION OF POINTERS

[75] Inventor: John Mark Zetts, Falls Church, Va.

[73] Assignee: International Business Machines Corporation, Armonk, N.Y.

[21] Appl. No.: 08/660,056

[22] Filed: May 31, 1996

[51] Int. Cl.⁶ .................. G09G 5/08; G09G 5/00
[52] U.S. Cl. ............. 345/145; 345/179; 345/349
[58] Field of Search ................. 345/156, 157, 345/159, 162, 161, 145, 146; 395/334, 339, 348, 349, 358

[56] References Cited

U.S. PATENT DOCUMENTS

| | | | |
|---|---|---|---|
| 4,625,202 | 11/1986 | Richmond et al. | 340/709 |
| 4,686,332 | 8/1987 | Greanias et al. | 178/19 |
| 5,007,085 | 4/1991 | Greanias et al. | 380/25 |
| 5,091,866 | 2/1992 | Takagi | 395/158 |
| 5,157,384 | 10/1992 | Greanias et al. | 340/706 |
| 5,231,698 | 7/1993 | Forcier | 395/146 |
| 5,252,951 | 10/1993 | Tannenbaum et al. | 345/156 |
| 5,255,363 | 10/1993 | Seyler | 395/164 |
| 5,276,816 | 1/1994 | Cavendish et al. | 395/275 |
| 5,423,039 | 6/1995 | Matteson | 395/650 |
| 5,442,376 | 8/1995 | Tannenbaum et al. | 345/156 |
| 5,442,736 | 8/1995 | Cummins | 395/134 |
| 5,473,343 | 12/1995 | Kimmich et al. | 345/145 |
| 5,515,081 | 5/1996 | Vasilik | 345/189 |
| 5,570,113 | 10/1996 | Zetts | 345/173 |
| 5,586,243 | 12/1996 | Barber et al. | 395/326 |

FOREIGN PATENT DOCUMENTS

| | | | |
|---|---|---|---|
| 0 533 607 A2 | 3/1993 | European Pat. Off. | G06F 15/20 |
| 0 678 805 A1 | 10/1995 | European Pat. Off. | G06F 3/033 |

OTHER PUBLICATIONS

"System Pointer Family," IBM Technical Disclosure Bulletin, vol. 37, No. 3, Mar. 1 1994, pp. 607–608.
IBM Technical Disclosure Bulletin, vol. 35, No. 1A, Jun. 1992, pp. 21–22, "Direct Entry From Different Calendar Views Through I–Beam Pointer Extension Techniques".
IBM Technical Disclosure Bulletin, vol. 38, No. 9, Sep. 1995, p. 461, "Data Interpretation Techniques For A Pen–Based Computer".

Primary Examiner—Jeffery Brier
Assistant Examiner—David L. Lewis
Attorney, Agent, or Firm—Mark S. Walker; Andrew J. Dillon

[57] ABSTRACT

A system and method for determining whether or not a non-system pointer is equivalent to a system pointer. The system and the non-system pointer each have pointer IDs. The system first determines whether the pointer ID of the non-system pointer is in a table of pointer IDs and flagged in the table as being equivalent to the system pointer. Whenever the pointer ID of the non-system pointer is not in the table of pointer IDs, the system determines, based on the shape of the non-system pointer, whether the non-system pointer is equivalent to the system pointer.

33 Claims, 33 Drawing Sheets

| | POINTER ID | PROCESS ID | I-BEAM FLAG |
|---|---|---|---|
| 0 | 12BF58A0 | 4 | TRUE |
| 1 | 12BF5300 | 17 | TRUE |
| 2 | 12BF6A20 | 23 | FALSE |
| 3 | 12BF64C0 | 23 | FALSE |
| 4 | 12BF4AE0 | 23 | TRUE |
| ⋮ | | | |
| 249 | | | |

```
0 0 0 0 0 0 0 0 0 0 0 0 0 0 0 0 0 0 0 0 0 0 0 0 0 0 0 0 0 0    */
0 0 0 0 0 0 0 0 0 0 0 0 0 0 0 0 0 0 0 0 0 0 0 0 0 0 0 0 0 0    */
0 0 0 0 0 0 0 0 0 0 0 0 0 0 0 0 0 0 0 0 0 0 0 0 0 0 0 0 0 0    */
0 0 0 0 0 0 0 0 0 0 0 0 0 0 0 0 0 0 0 0 0 0 0 0 0 0 0 0 0 0    */
1 1 1 1 1 1 1 1 1 1 1 1 1 1 1 0 0 0 0 0 0 0 0 0 0 0 0 0 0 0    */
1 1 1 1 1 1 1 1 1 1 1 1 1 1 1 0 0 0 0 0 0 0 0 0 0 0 0 0 0 0    */
1 1 1 1 1 1 1 1 1 1 1 1 1 1 1 0 0 0 0 0 0 0 0 0 0 0 0 0 0 0    */
0 1 1 1 1 1 1 1 1 1 1 1 1 1 1 0 0 0 0 0 0 0 0 0 0 0 0 0 0 0    */
0 1 1 1 1 1 1 1 1 1 1 1 1 1 1 0 0 0 0 0 0 0 0 0 0 0 0 0 0 0    */
0 1 1 1 1 1 1 1 1 1 1 1 1 1 1 0 0 0 0 0 0 0 0 0 0 0 0 0 0 0    */
0 1 1 1 1 1 1 1 1 1 1 1 1 1 1 0 0 0 0 0 0 0 0 0 0 0 0 0 0 0    */
0 1 1 1 1 1 1 1 1 1 1 1 1 1 1 0 0 0 0 0 0 0 0 0 0 0 0 0 0 0    */
0 1 1 1 1 1 1 1 1 1 1 1 1 1 1 0 0 0 0 0 0 0 0 0 0 0 0 0 0 0    */
0 1 1 1 1 1 1 1 1 1 1 1 1 1 1 0 0 0 0 0 0 0 0 0 0 0 0 0 0 0    */
0 0 1 1 1 1 1 1 1 1 1 1 1 1 0 0 0 0 0 0 0 0 0 0 0 0 0 0 0 0    */
0 0 0 1 1 1 1 1 1 1 1 1 1 0 0 0 0 0 0 0 0 0 0 0 0 0 0 0 0 0    */
0 0 0 0 1 1 1 1 1 1 1 1 0 0 0 0 0 0 0 0 0 0 0 0 0 0 0 0 0 0    */
0 0 0 0 0 1 1 1 1 1 1 0 0 0 0 0 0 0 0 0 0 0 0 0 0 0 0 0 0 0    */
0 0 0 0 0 1 1 1 1 1 1 1 0 0        ← SCANLINE MIDPOINT         2640
0 0 0 0 0 1 1 1 1 1 1 0 0 0 0 0 0 0 0 0 0 0 0 0 0 0 0 0 0 0    */
0 0 0 0 1 1 1 1 1 1 1 0 0 0 0 0 0 0 0 0 0 0 0 0 0 0 0 0 0 0    */
0 0 0 1 1 1 1 1 1 1 1 1 0 0 0 0 0 0 0 0 0 0 0 0 0 0 0 0 0 0    */
0 0 1 1 1 1 1 1 1 1 1 1 0 0 0 0 0 0 0 0 0 0 0 0 0 0 0 0 0 0    */
0 1 1 1 1 1 1 1 1 1 1 1 1 0 0 0 0 0 0 0 0 0 0 0 0 0 0 0 0 0    */
0 1 1 1 1 1 1 1 1 1 1 1 1 0 0 0 0 0 0 0 0 0 0 0 0 0 0 0 0 0    */
0 1 1 1 1 1 1 1 1 1 1 1 1 0 0 0 0 0 0 0 0 0 0 0 0 0 0 0 0 0    */
0 1 1 1 1 1 1 1 1 1 1 1 1 0 0 0 0 0 0 0 0 0 0 0 0 0 0 0 0 0    */
0 1 1 1 1 1 1 1 1 1 1 1 1 0 0 0 0 0 0 0 0 0 0 0 0 0 0 0 0 0    */
0 1 1 1 1 1 1 1 1 1 1 1 1 0 0 0 0 0 0 0 0 0 0 0 0 0 0 0 0 0    */
1 1 1 1 1 1 1 1 1 1 1 1 1 0 0 0 0 0 0 0 0 0 0 0 0 0 0 0 0 0    */
1 1 1 1 1 1 1 1 1 1 1 1 1 0 0 0 0 0 0 0 0 0 0 0 0 0 0 0 0 0    */
1 1 1 1 1 1 1 1 1 1 1 1 1 0 0 0 0 0 0 0 0 0 0 0 0 0 0 0 0 0    */
           ↑                                ↘
        COLUMN MIDPOINT                      2610
```

FIG. 26A

```
/* 0 0 0 0 0 0 0 0 0 0 0 0 0 0 0 0 0 0 0 0 0 0 0 0 0 0 0 0 0 0 0 0 */
/* 0 0 0 0 0 0 0 0 0 0 0 0 0 0 0 0 0 0 0 0 0 0 0 0 0 0 0 0 0 0 0 0 */
/* 0 0 0 0 0 0 0 0 0 0 0 0 0 0 0 0 0 0 0 0 0 0 0 0 0 0 0 0 0 0 0 0 */
/* 0 0 0 0 0 0 0 0 0 0 0 0 0 0 0 0 0 0 0 0 0 0 0 0 0 0 0 0 0 0 0 0 */
/* 0 0 0 0 0 0 0 0 0 0 0 0 0 0 0 0 0 0 0 0 0 0 0 0 0 0 0 0 0 0 0 0 */
/* 0 0 0 0 0 0 0 0 0 0 0 0 0 0 0 0 0 0 0 0 0 0 0 0 0 0 0 0 0 0 0 0 */
/* 0 0 0 0 0 0 0 0 0 0 0 0 0 0 0 0 0 0 0 0 0 0 0 0 0 0 0 0 0 0 0 0 */
/* 0 0 0 0 0 0 0 0 0 0 0 0 0 0 0 0 0 0 0 0 0 0 0 0 0 0 0 0 0 0 0 0 */
/* 0 0 0 0 0 0 0 0 0 0 0 0 0 0 0 0 0 0 0 0 0 0 0 0 0 0 0 0 0 0 0 0 */
/* 0 0 0 0 0 0 0 0 0 0 0 0 0 0 0 0 0 0 0 0 0 0 0 0 0 0 0 0 0 0 0 0 */
/* 0 0 0 0 0 0 0 0 0 0 0 0 0 0 0 0 0 0 0 0 0 0 0 0 0 0 0 0 0 0 0 0 */
/* 1 1 1 1 1 1 1 1 1 1 1 1 1 1 0 0 0 0 0 0 0 0 0 0 0 0 0 0 0 0 0 0 */
/* 1 1 1 1 1 1 1 1 1 1 1 1 1 1 0 0 0 0 0 0 0 0 0 0 0 0 0 0 0 0 0 0 */
/* 0 1 1 1 1 1 1 1 1 1 1 1 1 1 0 0 0 0 0 0 0 0 0 0 0 0 0 0 0 0 0 0 */
/* 0 1 1 1 1 1 1 1 1 1 1 1 1 1 0 0 0 0 0 0 0 0 0 0 0 0 0 0 0 0 0 0 */
/* 0 1 1 1 1 1 1 1 1 1 1 1 1 1 0 0 0 0 0 0 0 0 0 0 0 0 0 0 0 0 0 0 */
/* 0 0 1 1 1 1 1 1 1 1 1 1 1 0 0 0 0 0 0 0 0 0 0 0 0 0 0 0 0 0 0 0 */
/* 0 0 0 1 1 1 1 1 1 1 1 1 0 0 0 0 0 0 0 0 0 0 0 0 0 0 0 0 0 0 0 0 */
/* 0 0 0 0 1 1 1 1 1 1 1 0 0 0 0 0 0 0 0 0 0 0 0 0 0 0 0 0 0 0 0 0 */  2630
/* 0 0 0 0 0 1 1 1 1 1 0 0 0 0 0 0 0 0 0 0 0 0 0 0 0 0 0 0 0 0 0 0 */
/* 0 0 0 0 0 0 1 1 1 0 0 0 0 0 0 0 0 0 0 0 0 0 0 0 0 0 0 0 0 0 0 0 */
/* 0 0 0 0 0 0 1 1 1 0 0 0 0   ← SCANLINE MIDPOINT
/* 0 0 0 0 0 0 1 1 1 0 0 0 0 0 0 0 0 0 0 0 0 0 0 0 0 0 0 0 0 0 0 0 */
/* 0 0 0 0 0 1 1 1 1 0 0 0 0 0 0 0 0 0 0 0 0 0 0 0 0 0 0 0 0 0 0 0 */
/* 0 0 0 0 1 1 1 1 1 1 0 0 0 0 0 0 0 0 0 0 0 0 0 0 0 0 0 0 0 0 0 0 */
/* 0 0 0 1 1 1 1 1 1 1 1 0 0 0 0 0 0 0 0 0 0 0 0 0 0 0 0 0 0 0 0 0 */
/* 0 0 1 1 1 1 1 1 1 1 1 1 0 0 0 0 0 0 0 0 0 0 0 0 0 0 0 0 0 0 0 0 */
/* 0 1 1 1 1 1 1 1 1 1 1 1 1 0 0 0 0 0 0 0 0 0 0 0 0 0 0 0 0 0 0 0 */
/* 0 1 1 1 1 1 1 1 1 1 1 1 1 1 0 0 0 0 0 0 0 0 0 0 0 0 0 0 0 0 0 0 */
/* 0 1 1 1 1 1 1 1 1 1 1 1 1 1 0 0 0 0 0 0 0 0 0 0 0 0 0 0 0 0 0 0 */
/* 1 1 1 1 1 1 1 1 1 1 1 1 1 1 0 0 0 0 0 0 0 0 0 0 0 0 0 0 0 0 0 0 */
/* 1 1 1 1 1 1 1 1 1 1 1 1 1 1 0 0 0 0 0 0 0 0 0 0 0 0 0 0 0 0 0 0 */
                ↑                           ↑
         COLUMN MIDPOINT                   2620
```

FIG. 26B

|            |     |                              |     |          |
|------------|-----|------------------------------|-----|----------|
|            | /*  | 0 0 0 0 0 0 0 0 0 0 0 0 0 0 0 0 0 0 0 0 0 | */  |          |
|            | /*  | 1 1 1 1 1 1 1 1 1 1 1 1 1 1 1 0 0 0 0 0 0 | */  |          |
|            | /*  | 1 1 1 1 1 1 1 1 1 1 1 1 1 1 1 0 0 0 0 0 0 | */  |          |
|            | /*  | 0 1 1 1 1 1 1 1 1 1 1 1 1 1 0 0 0 0 0 0 0 | */  |          |
|            | /*  | 0 1 1 1 1 1 1 1 1 1 1 1 1 1 0 0 0 0 0 0 0 | */  |          |
| QUADRANT 4 | /*  | 0 1 1 1 1 1 1 1 1 1 1 1 1 1 0 0 0 0 0 0 0 | */  | QUADRANT 1 |
|            | /*  | 0 0 1 1 1 1 1 1 1 1 1 1 1 0 0 0 0 0 0 0 0 | */  |          |
|            | /*  | 0 0 0 1 1 1 1 1 1 1 1 1 0 0 0 0 0 0 0 0 0 | */  |          |
|            | /*  | 0 0 0 0 1 1 1 1 1 1 1 0 0 0 0 0 0 0 0 0 0 | */  | 2710     |
|            | /*  | 0 0 0 0 0 1 1 1 1 1 0 0 0 0 0 0 0 0 0 0 0 | */  |          |
|            | /*  | 0 0 0 0 0 0 1 1 1 0 0 0 0 0 0 0 0 0 0 0 0 | */  |          |
|            |     | ———— 0 0 1 1 1 0 0 ————     |     |          |
|            | /*  | 0 0 0 0 0 0 1 1 1 0 0 0 0 0 0 0 0 0 0 0 0 | */  | 2715     |
|            | /*  | 0 0 0 0 0 1 1 1 1 1 0 0 0 0 0 0 0 0 0 0 0 | */  |          |
|            | /*  | 0 0 0 0 1 1 1 1 1 1 1 0 0 0 0 0 0 0 0 0 0 | */  |          |
|            | /*  | 0 0 0 1 1 1 1 1 1 1 1 1 0 0 0 0 0 0 0 0 0 | */  |          |
|            | /*  | 0 0 1 1 1 1 1 1 1 1 1 1 1 0 0 0 0 0 0 0 0 | */  |          |
| QUADRANT 3 | /*  | 0 1 1 1 1 1 1 1 1 1 1 1 1 1 0 0 0 0 0 0 0 | */  | QUADRANT 2 |
|            | /*  | 0 1 1 1 1 1 1 1 1 1 1 1 1 1 0 0 0 0 0 0 0 | */  |          |
|            | /*  | 0 1 1 1 1 1 1 1 1 1 1 1 1 1 0 0 0 0 0 0 0 | */  |          |
|            | /*  | 1 1 1 1 1 1 1 1 1 1 1 1 1 1 1 0 0 0 0 0 0 | */  |          |
|            | /*  | 1 1 1 1 1 1 1 1 1 1 1 1 1 1 1 0 0 0 0 0 0 | */  |          |

METHOD AND SYSTEM FOR RECOGNITION OF POINTERS

BACKGROUND OF THE INVENTION

1. Field of the Invention

The present invention broadly relates to data processing systems. The invention has particular application in a multitasking pen-based computer system in which a single task is dedicated to routing user input such as keyboard, mouse or stylus events to various computer programs executing concurrently under user control.

2. Description of the Prior Art

Pen software extensions to operating systems, such as the preferred IBM OS/2 operating system, permit users to write directly into a window characters that are subsequently sent to a gesture and handwriting recognition engine for recognition. By default, the system treats the hand printed shapes as gestures unless the window is one which accepts text such as an edit field or a text entry window. Pen-based systems are described generally in U.S. Pat. No. 5,252,951 by Alan Tannenbaum, et al. entitled "Graphical User Interface with Gesture Recognition in a Multi-Application Environment".

By convention, fields that accept text indicate so by displaying an I-beam mouse pointer when the pointer is positioned over the text field. The operating system provides a standard I-beam mouse pointer for applications to use so that, 1) all entry fields have a uniform look and, 2) the developer of each application does not have to design and ship a custom version of an I-beam mouse pointer with its respective product.

The pen-based system software takes advantage of this standard I-beam to know the user is writing into a text field. As the user moves the stylus close to the surface and begins to write, the system moves the mouse pointer to the location of the stylus. If the mouse pointer is in a text field, the pointer becomes an I-beam. The pen-based system is unaware of the pointer shape but compares the ID of the pointer to the ID of the system supplied I-beam pointer. If the IDs match, the system takes two actions. First, the system changes the mouse pointer from an I-beam to a pen figure to alert the user that he or she may write directly into the field with the stylus. Second, the system treats the handwritten characters primarily as text rather than gestures. The examination of application, window, and pointer characteristics for the purpose interpreting pen or stylus input is discussed in IBM Technical Disclosure Bulletin, Vol. 38, No. 09, September 1995, entitled, "Data Interpretation Techniques for a Pen-based Computer".

The problem pen faces however is that many application developers ship their applications with their own version of an I-beam pointer. These developers design their own I-beam pointer shapes for aesthetic reasons or simply to distinguish their applications from those of the competition. In all cases, though, these custom I-beams still retain some resemblance to the standard I-beam shape to ensure good human factors. Otherwise, users might become confused and not perceive that the fields accept text input. Unfortunately, most of the dominant word processor applications are shipped with their own I-beam pointers rendering the presently existing pen-based systems techniques of comparing the pointer IDs somewhat ineffective.

Another problem in pen-based systems is ascertaining when an application is unable to process mouse and keyboard input. An application normally signals this 'busy' condition by displaying an hour glass pointer. This is usually sufficient indication and the user ceases input until the hour glass pointer gets restored to the arrow pointer. In many cases however, while the application is in a busy state, there is already mouse or keyboard input in the system queue that has been directed to other active applications on the desktop. But given the design of both the OS/2 and Windows operating systems, the enqueued input cannot be dequeued and dispatched to the target application until the busy application has first, in effect, told the operating system it has finished dequeueing mouse and keyboard input. The operating system has no way of knowing the application is momentarily in a busy state, although the user does. If the operating system had way of detecting this busy state, it could summarily examine the input queue and dequeue/route any mouse or keyboard input that was directed at a non-busy application that was waiting on user input. The result would be the removal of a processing bottleneck.

It is therefore an object of the invention to optically recognize mouse pointers displayed by various computer program applications to determine the dynamic state or environment of the applications.

It is another object of the invention to perform accurate pointer shape recognition, ensuring that non-target pointer shapes are rejected with a high degree of confidence.

It is still a further object of the invention to perform pointer shape recognition in a computationally efficient manner so that the overhead added by the recognition process has no discernible effect on the responsiveness or performance of the computer.

It is yet a further object of the invention to perform pointer shape recognition on computers with varying display resolutions and color capabilities.

SUMMARY OF THE INVENTION

Briefly stated, the foregoing and other objects are accomplished by the method and system of the present invention. In one aspect of the present invention, the system determines whether or not a non-system pointer is equivalent to a system pointer. The system and the non-system pointer each have pointer ID. The system first determines whether the pointer ID of the non-system pointer is in a table of pointer IDs and flagged in the table as being equivalent to the system pointer. Whenever the pointer ID of the non-system pointer is not in the table of pointer IDs, the system determines, based on the shape of the non-system pointer, whether the non-system pointer is equivalent to the system pointer.

The system determines, based on shape, whether the non-system pointer is equivalent to the system pointer by comparing the non-system pointer to a predefined mask. Whenever all picture elements of the non-system pointer lie within the mask, the system determines whether the number of picture elements comprising the non-system pointer is greater than a predetermined threshold. Whenever the system determines the non-system pointer to be equivalent to the system pointer, the system adds the pointer ID of the non-system pointer to the table of pointer IDs and flags the pointer ID as being equivalent to the system pointer.

In another aspect of the present invention, the system may determine whether the non-system pointer is equivalent to the system pointer by first comparing the non-system pointer with a predefined course mask. If all picture elements of the non-system pointer lie within the course mask, the system then compares the non-system pointer with a predefined fine mask. Whenever all picture elements of said non-system pointer lie within the fine mask, the system determines whether the number of picture elements comprising the non-system pointer exceeds a predetermined threshold. The system may then determine whether the non-system pointer satisfies a predetermined symmetry condition.

BRIEF DESCRIPTION OF THE DRAWINGS

FIGS. 5A, 5B and 5C illustrate an I-beam pointer as found in the pointer image (5A), the image left-justified (5B) and the image bottom-left-justified (5C).

FIG. 6 illustrates a bitmap formatted as both 8-bit and 32-bit data.

FIG. 7 illustrates I-beam pointer shape masks for VGA display resolution.

FIG. 8 illustrates I-beam pointer shape masks for XGA display resolution.

FIGS. 25A and 25B are representations of the course and fine mask for the hour glass pointer shape.

FIG. 26 illustrates misalignment of the hour glass pointer image and the fine mask.

FIG. 27 illustrates the symmetry lines and quadrants of the hour glass pointer shape.

DETAILED DESCRIPTION OF THE PREFERRED EMBODIMENT

Figure 1:
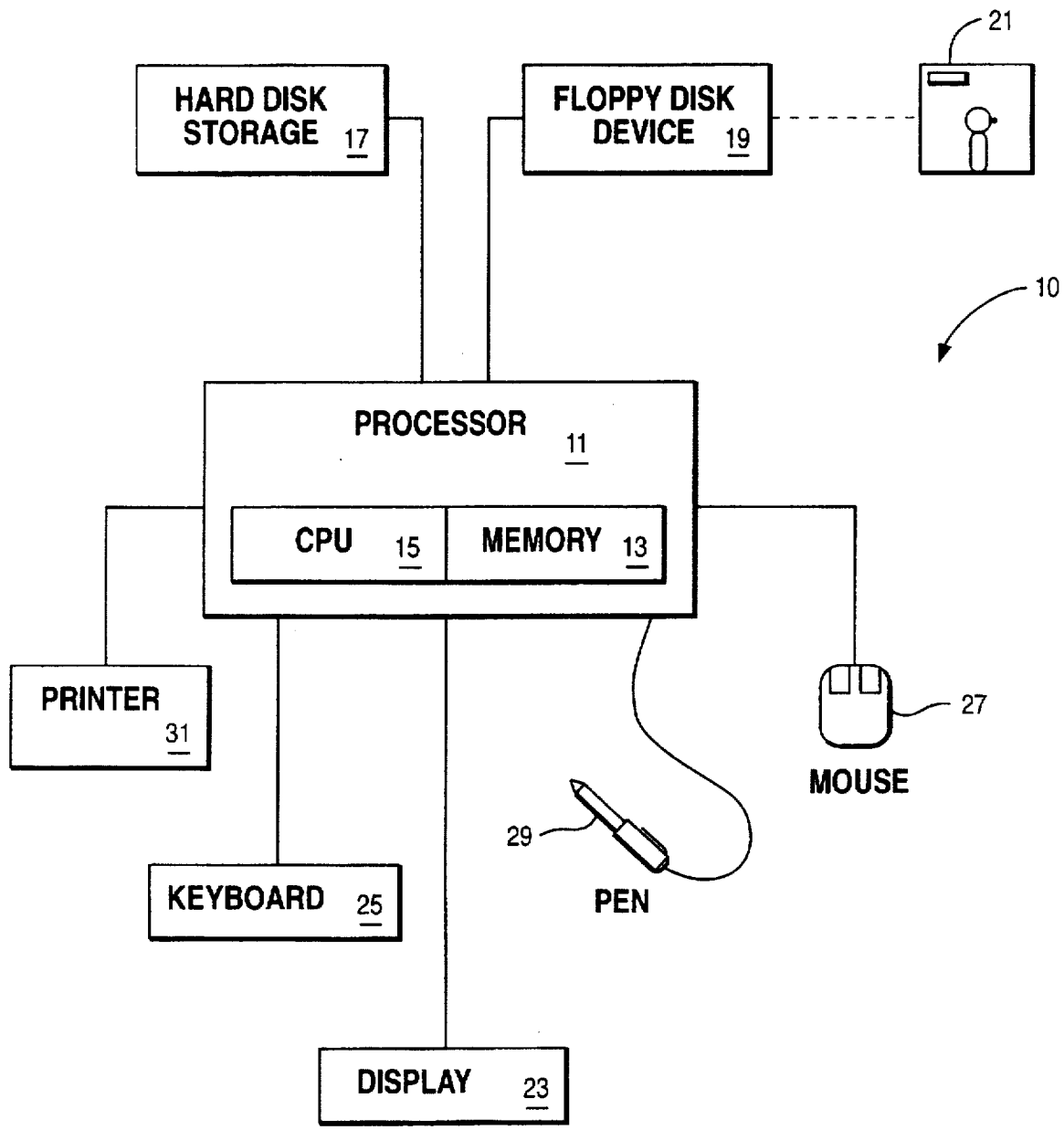
FIG. 1 is a hardware block diagram of a system according to the present invention.

Referring now to the drawings, and first FIG. 1, a hardware block diagram of a personal computer system with which the system and method of the present invention may be implemented is designated generally by the numeral 10. System 10 includes processor 11, which includes a central processing unit (CPU) 13 and random access memory 15. System 10 preferably also includes additional memory in the form of a hard disk storage device 17 and a floppy disk device 19. Floppy disk device 19 is adapted to receive a diskette 21 on which may be recorded software for programs, including a software implementation of the present invention. System 10 also includes user interface hardware devices including a display 23, a keyboard 25, a mouse 27, and a pen or stylus 29. System 10 preferably includes a printer 31.

Figure 2:
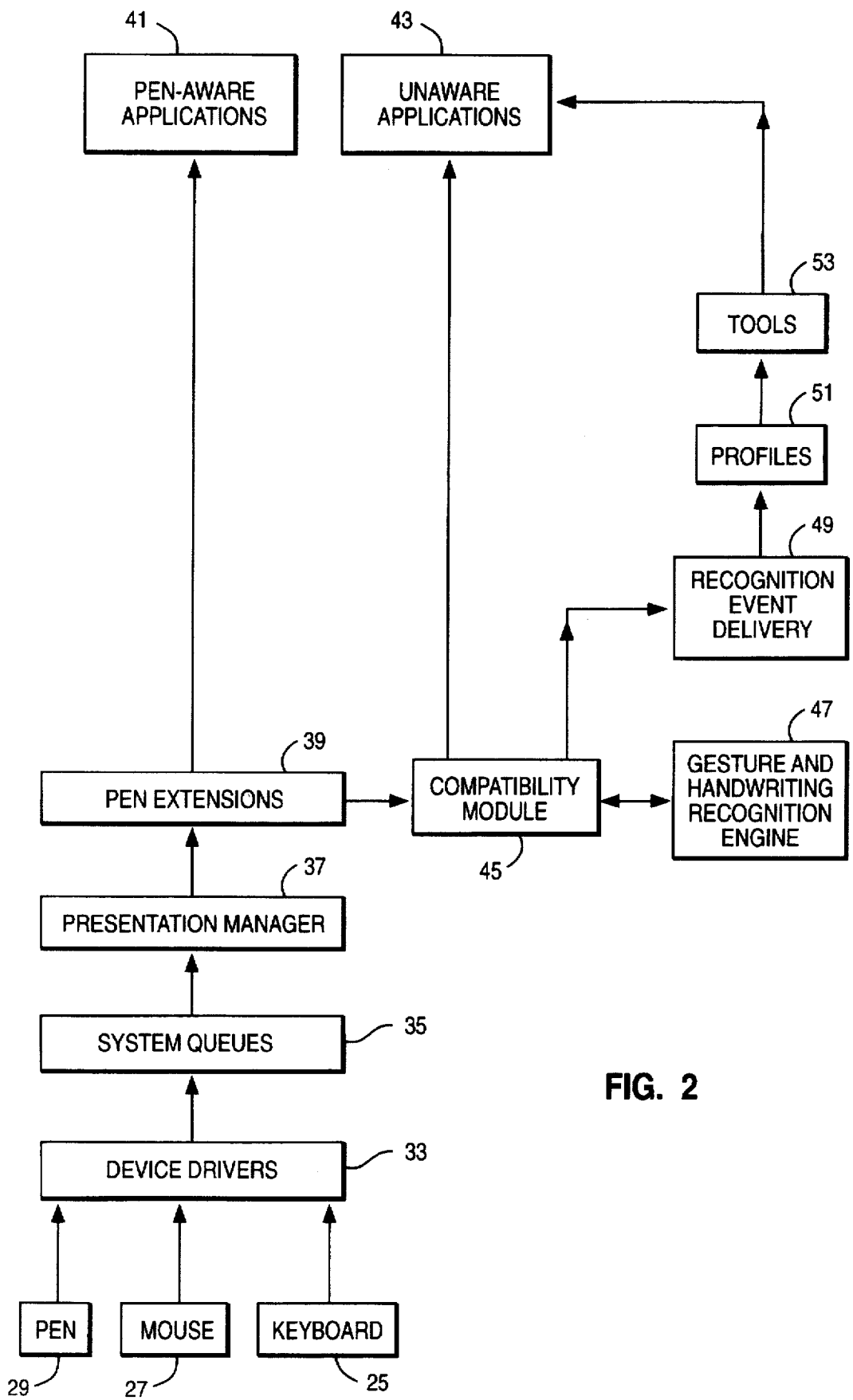
FIG. 2 is an architectural diagram of the major software components of the present invention.

Referring now to FIG. 2, there is illustrated a high level diagram of the major software system components of the pen-based system of the present invention. At the bottom of FIG. 2, the output signals from pen 29, mouse 27, and keyboard 25 are connected to device drivers 33, which are modules that provide low-level I/O support to their respective devices. Device drivers 33 put events into system queues 35. The events in system queues 35 are subsequently processed by a presentation manager 37 which then routes pen and mouse events to pen extensions 39 for processing.

A typical system includes both pen-aware applications 41 and pen-unaware applications 43. Pen-aware applications have the native capacity to recognize and process pen input. Pen-unaware applications are those that have the native capacity only to recognize and process keyboard and/or mouse input. Therefore, pen extensions 39 routes pen events directly to pen-aware applications 41. However, since pen-unaware applications 43 are not capable of using pen functionality, the system includes a compatibility module 45.

Compatibility module 45 acts as a pen-aware application on behalf of pen-unaware applications. If, for example, the user inputs handwritten character events to a pen-aware application, pen extensions 39 routes those events to compatibility module 45, which in turn routes all pen strokes to the gesture and handwriting recognition engine 47. Gesture and handwriting recognition engine 47 processes the pen stroke events and returns a recognition result to the compatibility module 45.

If the recognition event is a gesture, compatibility module 45 routes it to a recognition event delivery subsystem 49, which accesses profiles 51 set up for the user to determine what actions to perform in a pen-unaware application in response to a particular gesture. Optionally, some tools 53 may be invoked to perform some action on the pen-unaware application 43. If the recognition result returned to compatibility module 45 is recognized as handwriting, the resultant text string is routed directly to the appropriate pen-unaware application 43.

Figure 3A:
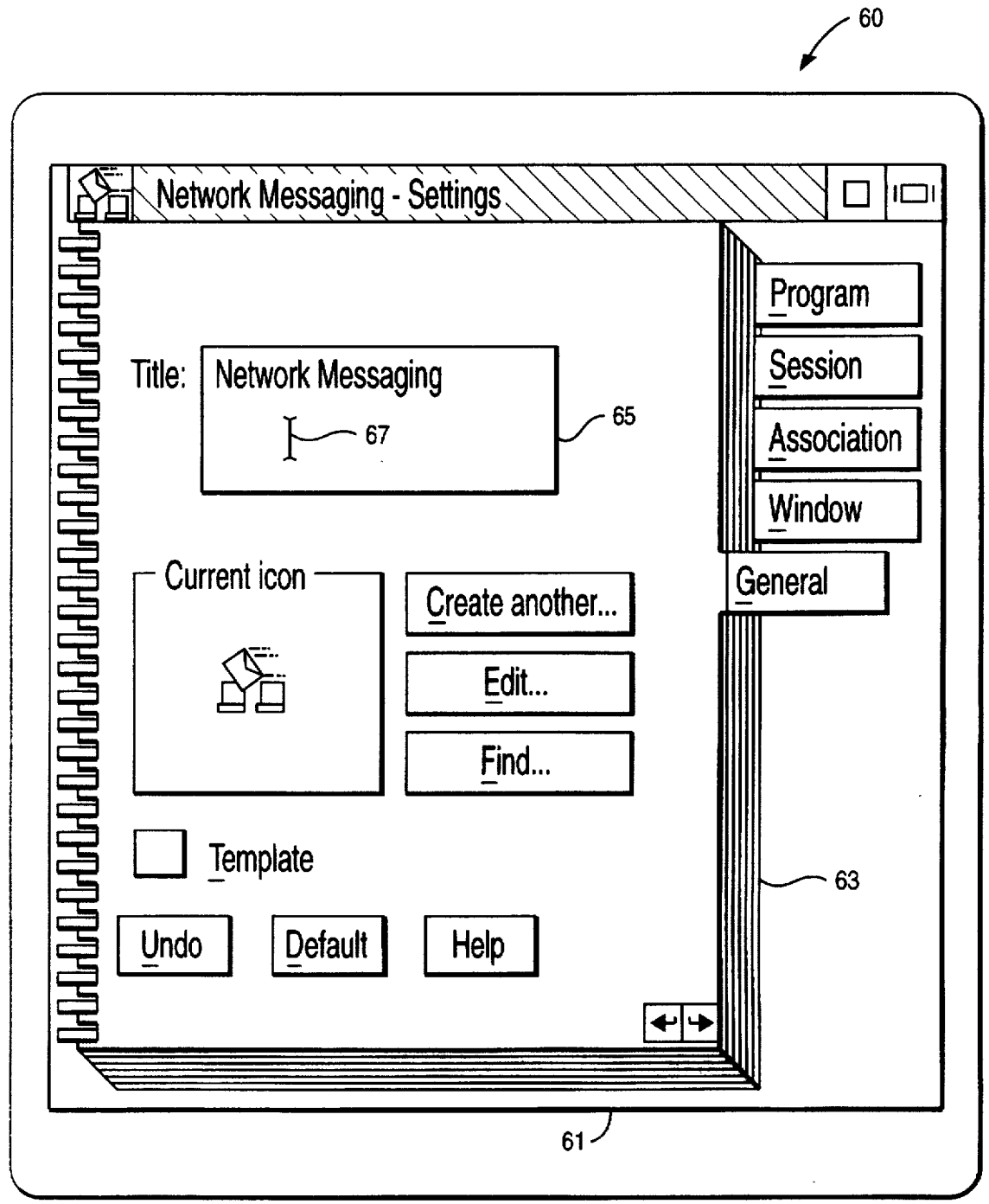
FIGS. 3A and 3B are pictorial representations of an editable text window displaying an I-beam and a pen pointer shape, respectively.

Referring now to FIG. 3A, a computer display screen is designated generally by the numeral 60. Screen 60 has displayed thereon a window 61, which in turn displays notebook 63. In a manner familiar to those skilled in the art, notebook 63 includes various tabs and buttons, and a text entry field 65. In a pen-based system, whenever the user brings the pen or stylus (not shown) near screen 60, the system moves the pointer to the location of the pen and processes actions with the pen according to the characteristics of the pen location. In FIG. 3A, pointer is in text field 65 and it has assumed the shape of an I-beam 67. The I-beam pointer shape indicates to the user that text field 65 will accept text input from the keyboard.

Figure 3B:
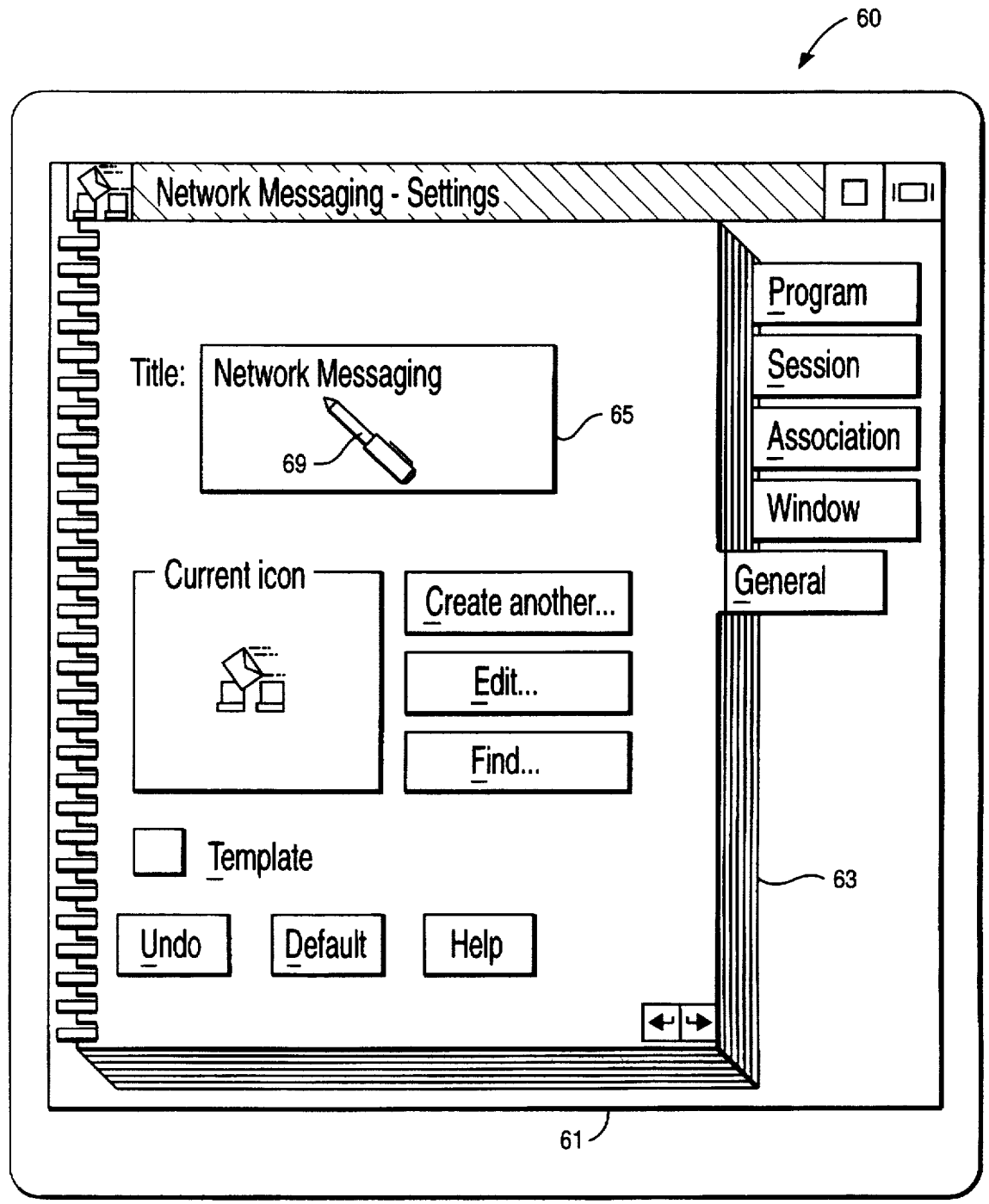

In FIG. 3B, which is generally similar to FIG. 3A, the system has drawn a pen-shaped pointer 69 in place of I-beam pointer of FIG. 3A. Pen-shaped pointer 69 indicates to the user that text field 65 will accept handwritten input in the form of characters or gestures.

Figure 4:
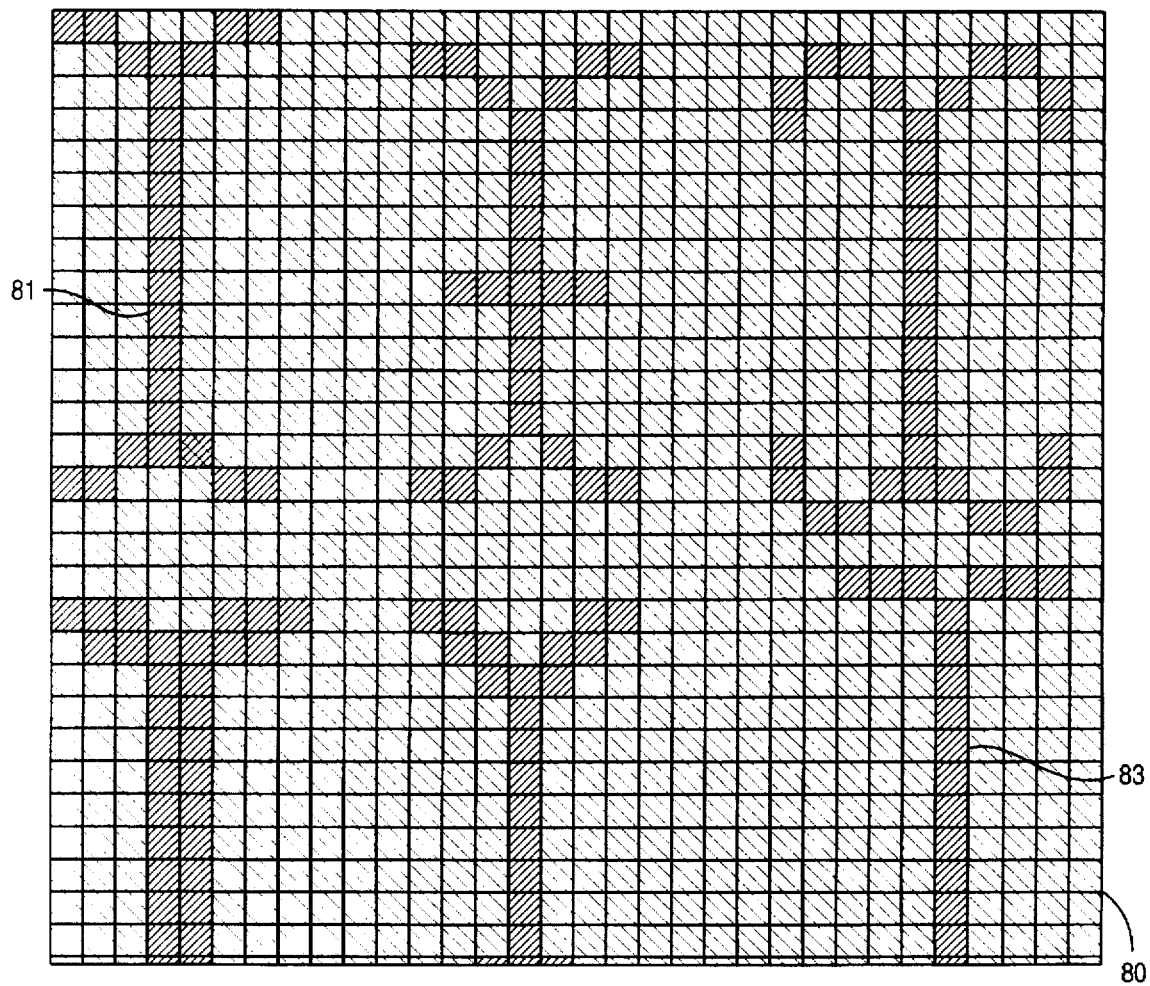
FIG. 4 is a pictorial representation illustrating various I-beam pointers.

Referring now to FIG. 4, there is shown a pictorial representation of an icon bitmap 80, such as would be displayed in an icon editor application, with six representative I-beam pointer shapes drawn therein. Icon bitmap 80 is a grid of 32×32 elements, with each element representing one picture element (pel) of VGA resolution. The I-beam pointer shapes illustrated in FIG. 4 include the OS/2 (TM) I-beam pointer 81 and the Windows (TM) I-beam pointer 83.

The I-beam pointer shapes illustrated in FIG. 4 show the considerable variation in pointers at the pel level while still retaining a shape that users will recognize immediately as I-beams. FIG. 4 also illustrates that an I-beam pointer may be placed by the designer anywhere in the bitmap.

Figure 10:
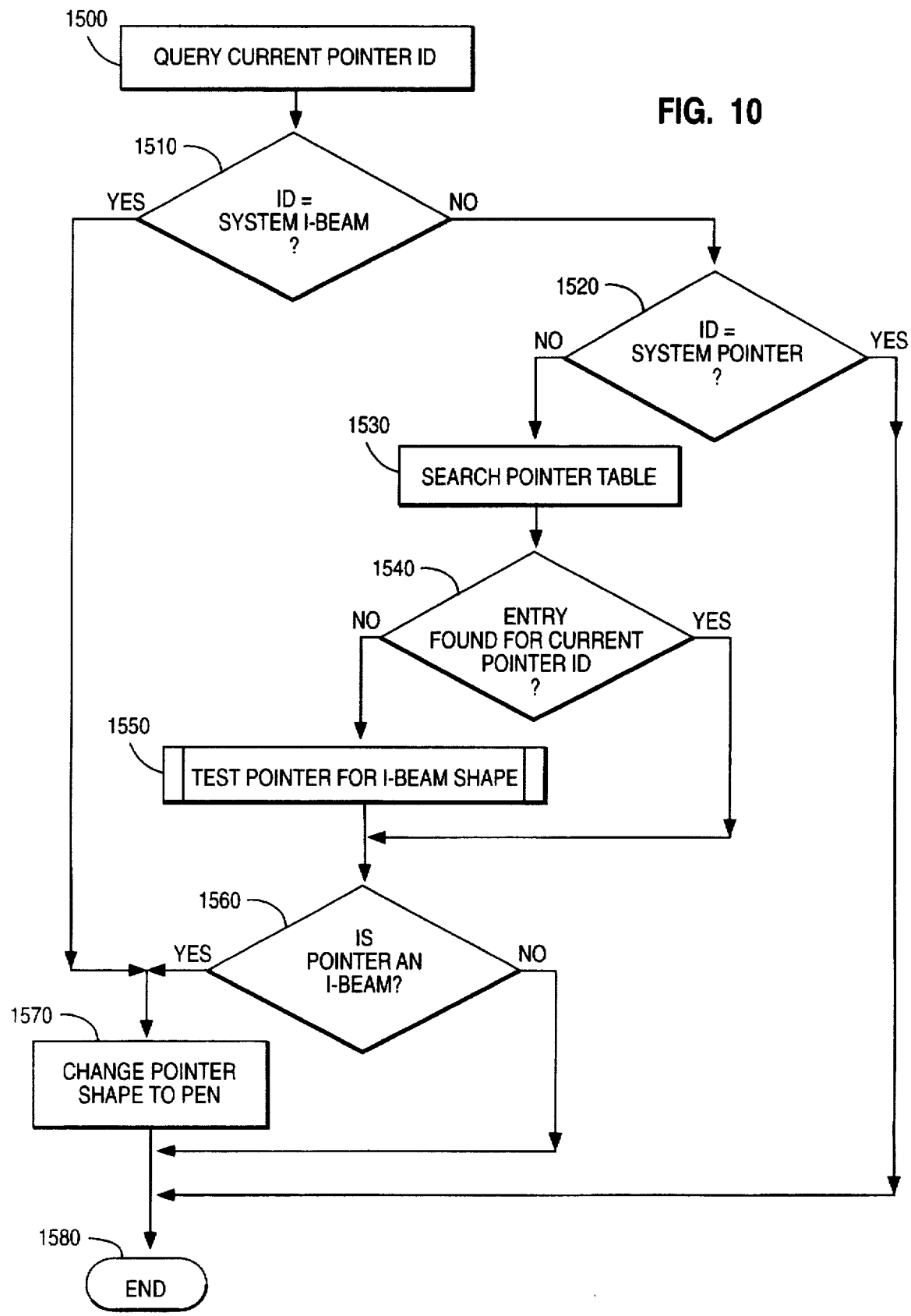

Referring now to FIG. 10, there is shown a high level flowchart that depicts a function in pen extensions 39 of FIG. 2 that is called for each mouse event received. This function is nominally called 60–100 times per second while the mouse or pen is in motion, since these are the standard reporting rates of such devices. For each incremental movement of the pointing device, the pointer shape must be redrawn at a new position. When the pointing device is over an entry field of any type, the operating system or application paints an I-beam pointer to inform the user that keyboard input is permissible. The function in FIG. 10 will cause the operating system to paint a pen pointer shape 69 of FIG. 3B instead if it is determined that the pointer is currently an I-beam.

Starting at block 1500, the ID of the current pointer is queried and it is tested to see if the current pointer is either the system I-beam, at decision block 1510, or another system pointer, at decision block 1520. If the pointer is the system I-beam, the system changes the pointer shape to the pen at block 1570 and ends at block 1580.

If the pointer is one of the other pointers supplied by the operating system, the system takes no further action and ends at block 1580. Otherwise, the system accesses a pointer table 1400 according to FIG. 9 at block 1530 to determine if an entry exists for the current pointer ID.

Figures 9, 11:
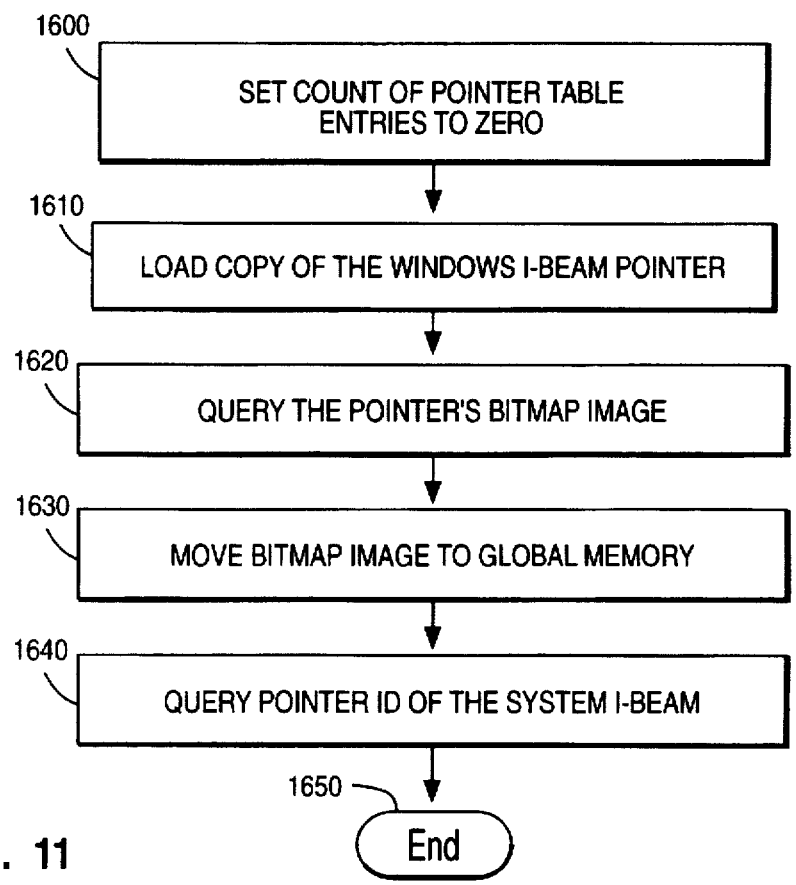
FIG. 9 is a diagram of a pointer table according to the present invention.
FIGS. 10–18 are flow diagrams of a preferred software implementation of the I-beam pointer shape recognition method and system of the present invention.

Turning to FIG. 9, pointer table 1400 is a table having columns including POINTER ID 1405, PROCESS ID 1410, I-BEAM FLAG 1415. In the preferred embodiment, pointer table 1400 is constructed to hold up to 250 entries in rows 0–249. As will be explained in detail, pointer table is maintained by adding entries as new pointers are recognized and deleting entries as applications are shut down.

Returning to FIG. 10, if pointer table 1400 contains an entry for the current pointer at decision block 1540, the system branches to test if the table entry is flagged as an I-beam at decision block 1560. If so, the system paints the pen pointer at block 1570; else the process ends at block 1580. If the test for a pointer table entry at decision block 1540 fails, another routine is called to test the pointer for the I-beam shape, indicated generally a process block 1550, and shown in detail in FIGS. 12–18. If the routine indicates the pointer is an I-beam at decision block 1560, the system changes the pointer to a pen at block 1570; else, the routine ends 1580.

Figure 12:
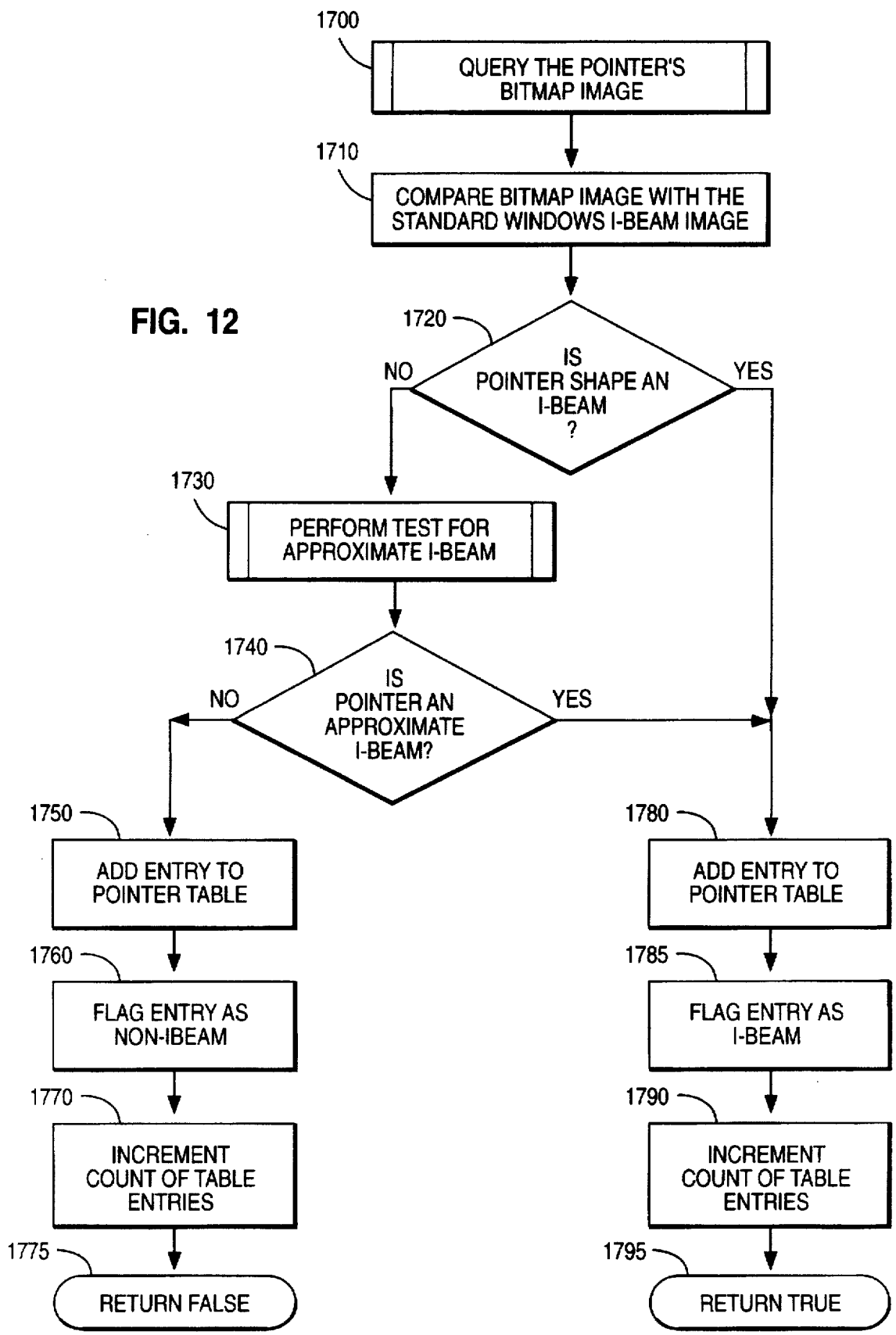

Referring to FIG. 12, it will be noted that the routine that tests for the I-beam shape at block 1550 of FIG. 10 is called only once for each application supplied pointer. This is because the routine of FIG. 12 makes an entry at blocks 1750 and 1780 in I-BEAM FLAG column 1415 of pointer table 1400 for each pointer flagging whether or not the pointer tested positive for the I-beam shape. Once a pointer table 1400 entry exists for a particular pointer ID, the result of the table entry test at decision block 1540 of FIG. 10 is always true and the overhead incurred by the I-beam recognition process is precluded. The fact that a large majority of applications use the system supplied I-beam and other system pointers and that the non-system pointers are tested only once keeps the processing requirements of this function to a minimum. The additional load on the system is not discernible by even a sophisticated and knowledgeable user.

Referring now to FIG. 11, there is shown what preprocessing is required at boot time to ready pen extension module 39 (FIG. 2) to test and monitor pointer shapes. At block 1600 the number of valid entries in pointer table 1400 is zeroed. In the preferred embodiment, a copy of the Windows™ I-beam bitmap is loaded at block 1610, queried at block 1620, and moved into global memory at block 1630 to facilitate the quick testing of Windows I-beam pointers.

The preferred OS/2 operating system is capable of executing native Windows applications by loading each Windows application in its own DOS virtual machine. A quirk of this implementation is that each active Windows application is given a unique I-beam pointer ID, even though the applications are all using the same Windows-supplied I-beam pointer. To speed up the recognition process, the bitmap of the standard Windows I-beam is kept in memory for fast memory to memory compares with the current pointer.

In the last step of initialization, the ID of the system supplied I-beam is queried at block 1640. This is the ID used in the test at decision block 1510 of FIG. 10.

Figure 13:
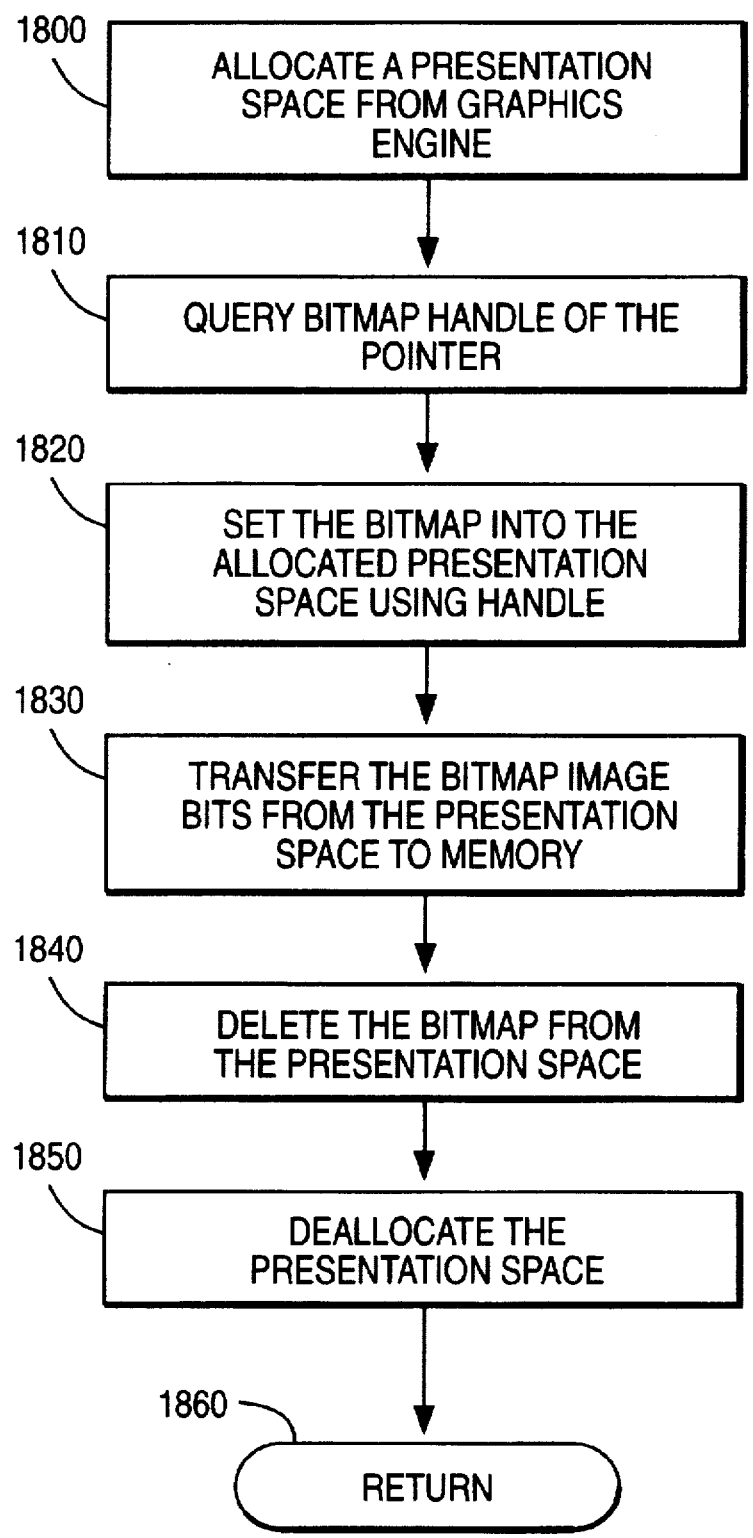

FIG. 12 charts the high level recognition process. As indicated generally at block 1700, the system calls a routine to copy the bitmap of the current pointer into memory where it can be examined and manipulated. FIG. 13 depicts this processing. It should be noted that pen extensions module 39 does not have the same access to bitmaps that the application has since it is running as an extension of the operating system and hence has little knowledge of the application's environment. This requires pen extensions 37 to access the bitmap data in a very indirect and roundabout manner. Using well known OS/2 system APIs, a presentation space is allocated at block 1800 and the handle of the pointer shape bitmap is queried at block 1810. Then the bitmap is set into the presentation space, which is the precursor for reading the bitmap data out of the restricted memory of the graphics engine and into pen extension's global memory at block 1830. Once the bitmap data has been obtained, it is deleted from the presentation space at block 1840 and the presentation space resource is deallocated at block 1850.

Returning to FIG. 12, after querying the bitmap data at block 1700, the system performs an optimized memory to memory compare at block 1710 to see if the pointer is the Windows I-beam. If the compare tests equal at 1720, an entry is added to pointer table 1400 at block 1780, the entry is flagged as an I-beam at block 1785, and the number of valid pointer table entries is incremented at 1790. The number of valid pointer entries is carefully maintained because pointer table 1400 is constructed to have 250 entries and to reduce the search time expended at block 1530, the search is suspended after the last valid entry is found.

If the compare at decision block 1720 tests false, another routine is called at block 1730 to conduct further tests on the pointer. If this routine reports a negative result at decision block 1740, an entry is added to the pointer table at block 1750, the entry is flagged as a non I-beam at block 1760, the number of valid pointer table entries is incremented at block 1770 and the routine returns the negative result to the calling routine at block 1775. If the compare at decision block 1740 tests true, an entry is added to the pointer table at block 1780, the entry is flagged as an I-beam at block 1785, the number of valid pointer table entries is incremented at 1790, and the result is returned at block 1795.

Referring to FIG. 5A, there is shown a bitmap array 510 for an arbitrary I-beam pointer shape. Bitmap array 510 is a 32×32 array of binary data, in which the pels of the I-beam shape are designated by ones. It will be noted that the I-beam of bitmap array 510 comprises 28 pels occupying nine columns and fourteen rows. It will further be noted that the I-beam is positioned at an arbitrary location within bitmap array 510.

Figure 14:
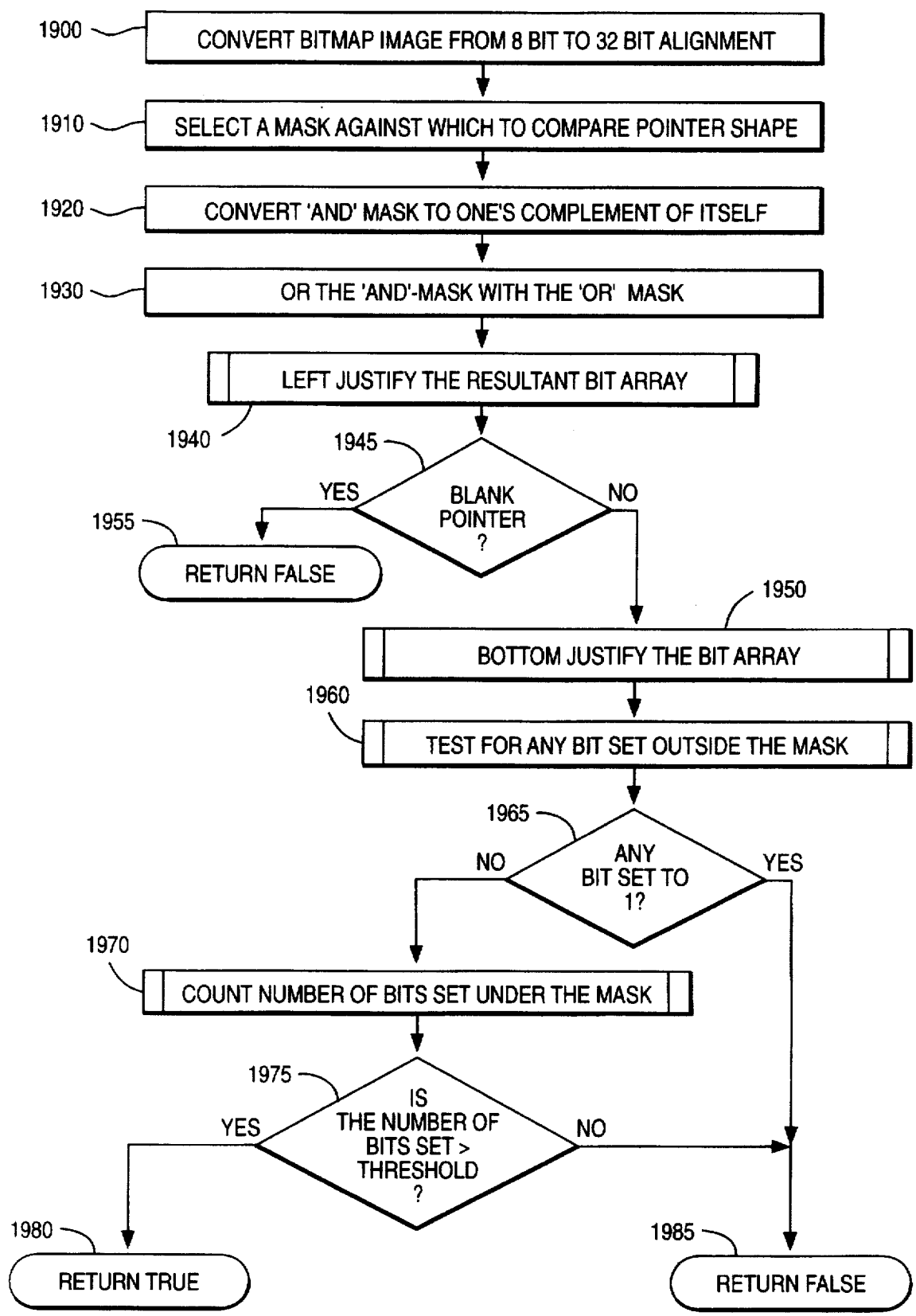

FIG. 14 illustrates the flow for the test of an approximate I-beam shape, for example the I-beam shape of FIG. 5A. To streamline processing through this routine and its ancillary subroutines, shown in FIGS. 15–18, the bitmap array is converted from 8-bit to 32-bit alignment at block 1900. The penalty incurred by reformatting the data is more than amply compensated for by the use of CPU instructions that operate on 32-bits at a time. FIG. 6 illustrates the conversion from 8-bit 600 to 32-bit 610 alignment of bit array 510. At block 1910, a pointer shape mask is selected according to the type of pointer being tested and the display resolution. A mask 710 for VGA resolution and a mask 810 for XGA resolution are illustrated in FIGS. 7 and 8, respectively. Utilizing different masks increases the accuracy of pointer shape recognition. At block 1920, the AND mask of the bitmap is converted to one's complement of itself in preparation for combining the AND and OR masks at block 1930. Because the shape of the pointer may be encoded into either the AND or the OR mask or both, the two masks are combined to ensure that the entire pointer shape is taken into account. And because the AND mask is normally all ones and changes to zeroes to encode the pointer shape, it is inverted at block 1920 to match the formatting of the OR mask, which is the opposite.

At this point, the bitmap has been reduced from two masks to one and in order to test the pointer shape against the mask, the pointer shape must be further isolated. To accomplish this, subroutines are called to justify the pointer shape to the left, at block 1940, and then to the bottom, at block 1950, of the bitmap array. Before bottom justifying the image though, the system tests at decision block 1945 to see if the pointer is blank, which is not an uncommon occurrence. If so, processing stops and the routine passes back a negative result at block 1955. The left and bottom justification processes results, respectively, in bitmap array 520 of FIG. 5B and bitmap array 530 of FIG. 5C.

Now that the image of the pointer is in a known place, another subroutine is called to determine if any bit outside the mask is set to one at block 1960. If even a single bit is set to one outside the mask, the test fails at decision block 1965 and false is returned to the calling routine at block 1985. If no bits are set to one outside the mask at decision block 1965, yet another subroutine is called at block 1975 to count the number of bits set under the shape mask. If a sufficient number of bits are set to one at decision block 1975, the pointer shape is considered to be approximately an I-beam and true is returned at block 1980. The threshold used to determine if the shape is an I-beam is empirically set and the algorithm currently expects counts of 17 bits set to one for VGA resolution and 24 bits set to one for XGA.

The four subroutines invoked generally at blocks 1940, 1950, 1960, and 1970 in FIG. 14 will now be examined in detail. The left justification of the bitmap is charted in FIG. 15. The pointer shape image is justified to the left and not the right because the scan lines of bitmaps must always be encoded in multiples of 32 bits. This is done to optimize video operations and allow memory to be mapped directly to the video hardware. Because of this, any bitmap with a resolution between 32×32 and 64×64 pels will always have 64 bits of data per scan line even though the image might use only a few bits of the second 32-bit word. These extra bits are referred to as padding, illustrated in column 820 of bitmap array 810 of FIG. 8, and if the algorithm used right justification, it would first have to shift the image past the padding of zeroes. This would be time consuming. When dealing with bitmaps of resolution greater than 32×32, the pointer image will usually be closer to the left edge of the bitmap.

Figure 15:
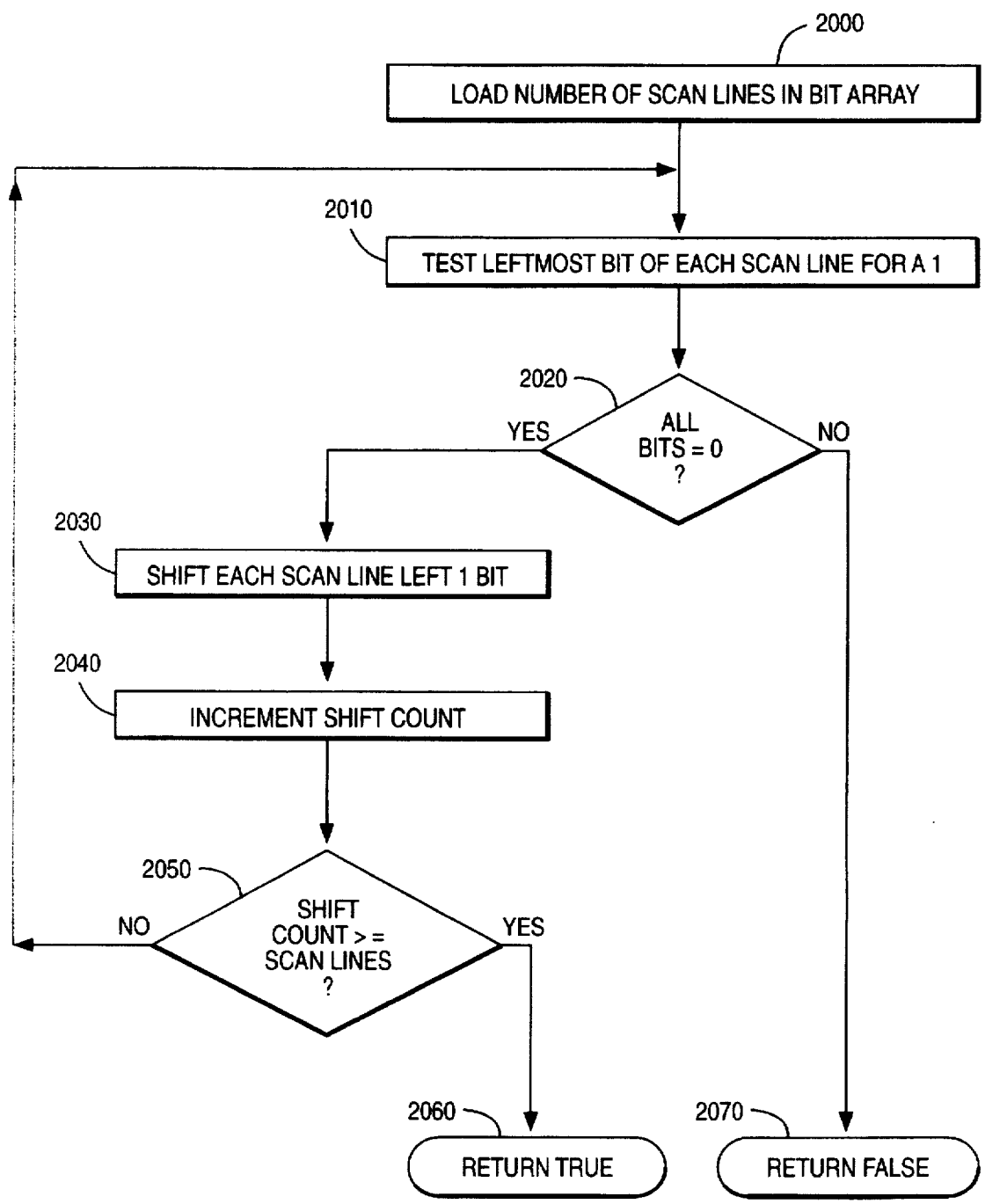

In FIG. 15, at block 2000, the number of scan lines is loaded from the bitmap header. Then, the subroutine enters a loop of blocks 2010–2050 where the leftmost bit of each scan line is tested for a one at block 2010. After testing each scan line, a test is made to see if the leftmost bits were all zeroes at decision block 2020. If so, then the start of the pointer image has not yet been located, so each scan line is shifted one bit to the left at block 2030 and the shift count is incremented 2040. A test is conducted to see to the number of shifted bits is greater than or equal to the number of scan lines at decision block 2050. This test catches the case of a blank pointer shape and prevents an infinite loop. If the shift count exceeds the scan line count at decision block 2050, the subroutine simply returns true at block 2060. The shifting of the image to the left at block 2030 continues until finally the leftmost bit of one of the scan lines contains a one at decision block 2020. When this occurs, this image is fully left justified and the subroutine returns false at block 2070.

Figure 16:
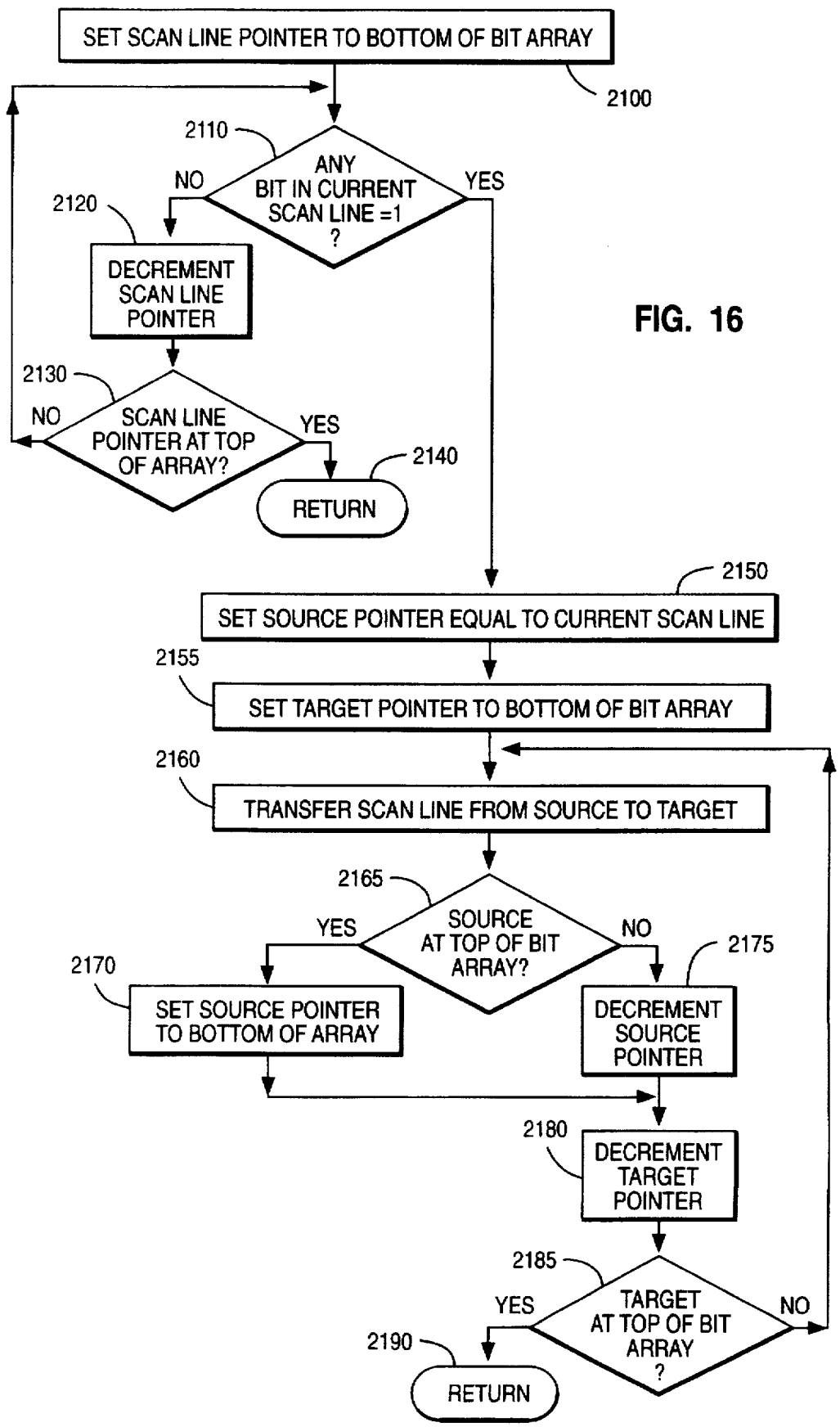

FIG. 16 illustrates the flow of the next step of the recognition algorithm wherein the left justified image is bottom justified. At entry, the scan line pointer is set to the bottom of the bitmap array at block 2100 so that testing commences at the last or bottom scan line. A loop is entered at blocks 2100–2130 in which each scan line is tested in its entirety for a non-zero bit at decision block 2110. If no non-zero bits are found, the scan line pointer is decremented at block 2120. If the scan line pointer points to the top scan line of the bitmap at decision block 2130, the routine returns at block 2140. Else, the loop iterates until a non-zero scan line is found signifying the bottom of the pointer image has been located at which point the loop exits and goes to the second half of the subroutine.

In the second half of the subroutine, a source pointer is initialized at block 2150 to point to the scan line at the bottom of the image and the target pointer is set to point to the bottom of the bitmap array at block 2155. These pointers are used to execute a memory-to-memory transfer of the bitmap that effectively bottom justifies the image. This is accomplished in the loop bounded by operations 2165 through 2185 inclusive. One by one, each scan line is transferred at block 2160 and the source and target pointers are decrement each time at blocks 2175 and 2180, respectively. After each scan line is transferred, a test is made at decision block 2165 to see if the current source pointer is pointing at the top of the bitmap. If so, the source pointer wraps around to the bottom of the bitmap at block 2170 so that the entire bitmap get transferred. Eventually, the target pointer hits the top of the bitmap at decision block 2185, signifying the completion of the transfer and the loop exits and the subroutine returns at block 2190.

Figure 17:
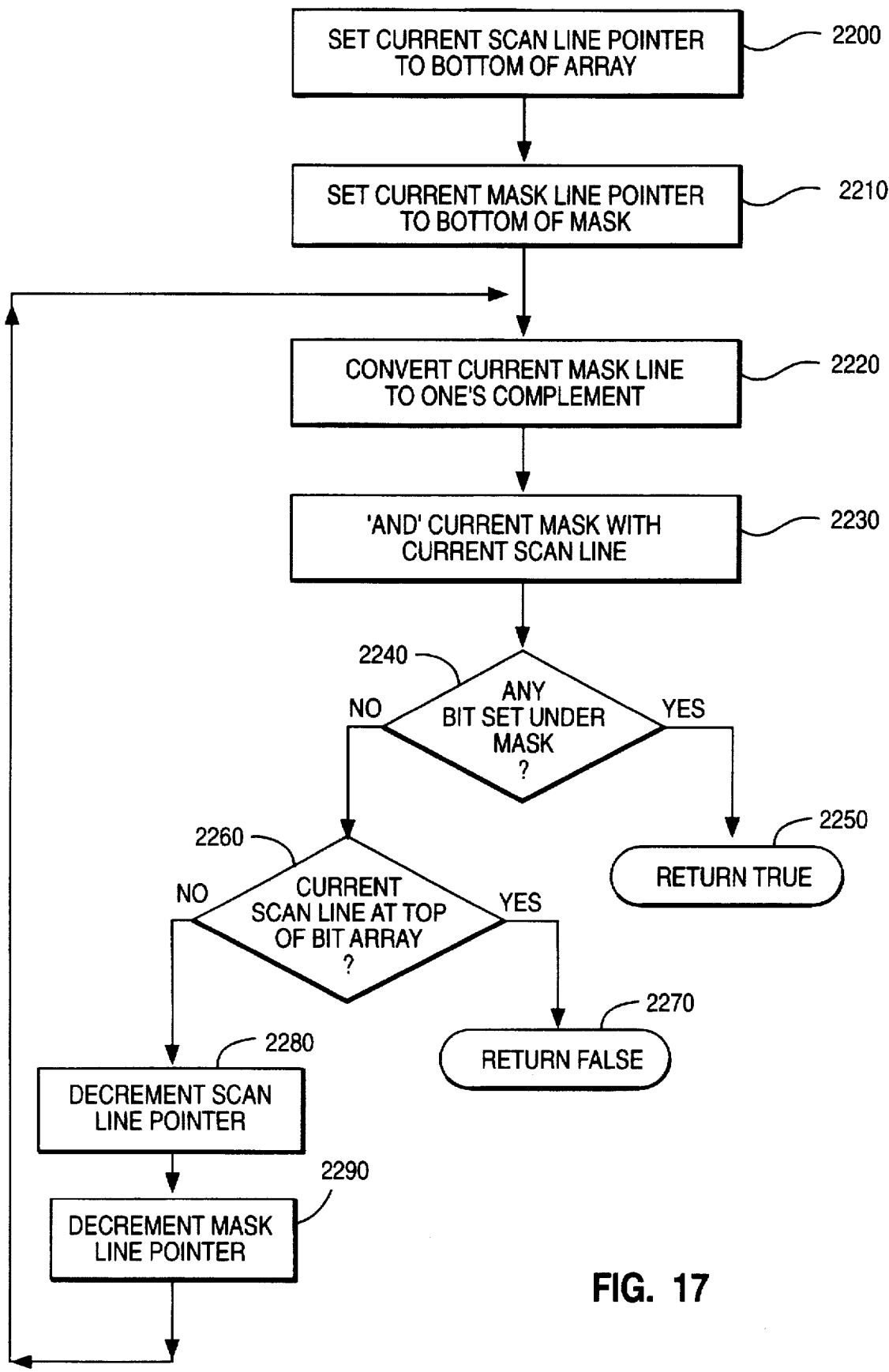

FIG. 17 depicts the logic flow that tests the pointer image for any bit set to one outside the shape mask. Again the scan line pointer is set to the bottom of the array at block 2200, the known start of the pointer image. The shape mask pointer is also set to the bottom on the mask at block 2210 to keep in locked step with the bitmap scan line. The loop from blocks 2220–2290 inclusive inverts the mask line by taking its ones complement at block 2220 and employing an AND operation at block 2230, and tests it against its associated bitmap scan line at decision block 2240. Any shape that is approximately an I-beam will not have bits set outside the mask. If a non-zero bit is found, the subroutine returns true 2250 which will indicate a non I-beam shape to the calling routine. Else, a test is made to see if the pointer reached the top of the of the bit array, signalling completion of the test at decision block 2260. If not, the scan line pointer and mask line pointer are decremented at blocks 2280 and 2290, respectively, and the loop iterates back to block 2220. If the last scan line is reached 2260 at decision block, no bits were found outside the mask and the subroutine returns false at block 2270.

Figure 18:
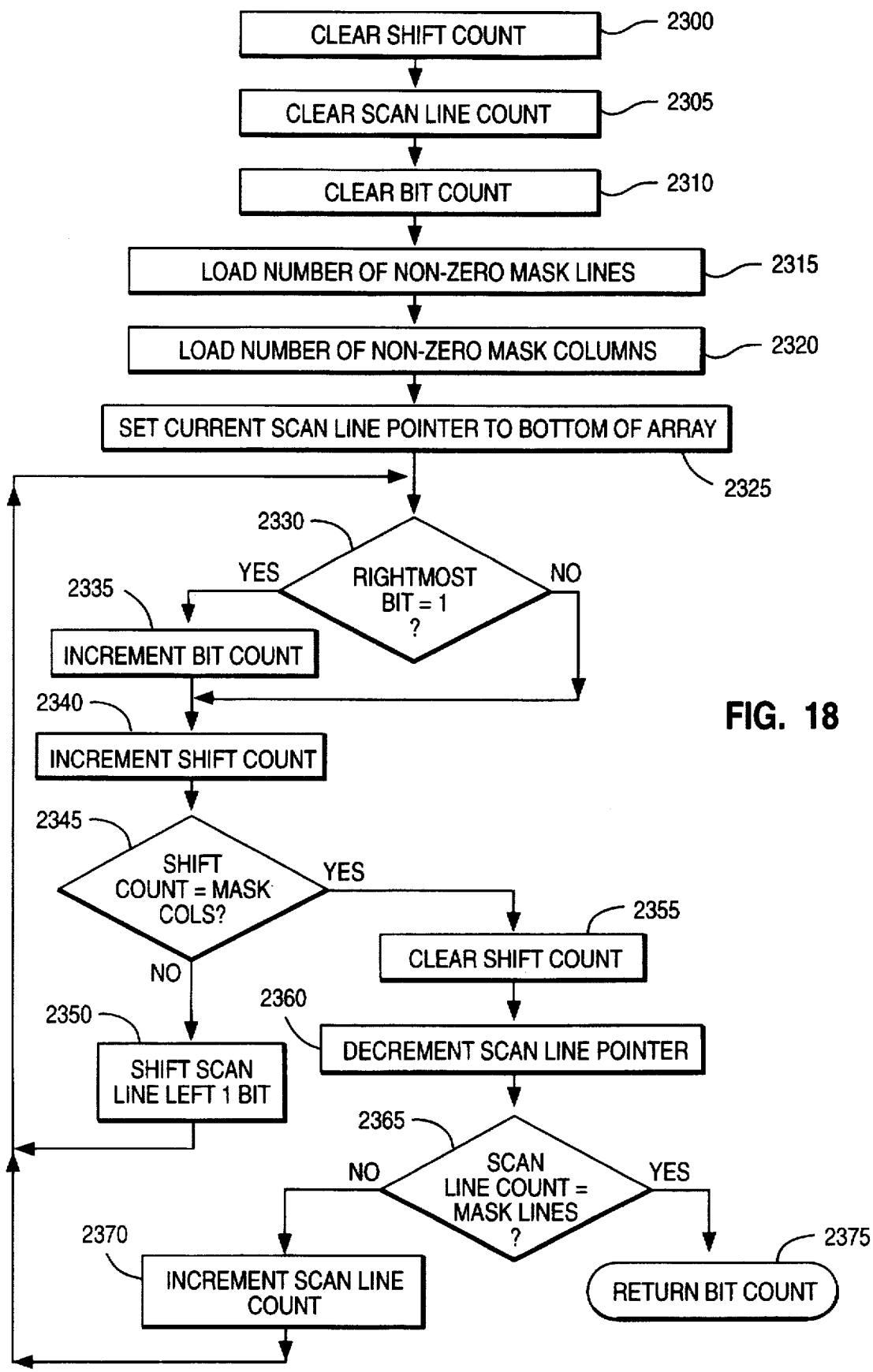

FIG. 18 is the final worker routine of the recognition algorithm. It has now been established that the all non-zero bits are under the shape mask, which signifies a close fit of the two shapes. The last task is to count the bits set under the mask to see if it qualifies as an I-beam. In actuality, the shape mask is not needed in this step since all the non-zero bits are within the mask. Initializing loop variables, the shift count, the scan line count, and the bit count are all cleared at blocks 2300, 2305, and 2310, respectively. Then two predefined constants, the number of non-zero mask lines and the number of non-zero mask columns, are loaded for use within the loop, at blocks 2315 and 2320, respectively. At block 2325, the current scan line pointer is set to the bottom of the bitmap array and then code falls into an inner loop 2330–2350 and an outer loop 2355–2370. The inner loop 2330–2350 traverses each scan line counting each non-zero bit, while the outer loop 2355–2370 iterates through each scan line.

At decision block 2330 the leftmost bit of the current scan line is tested for a one. If it is a one, the bit count is incremented block 2335. In any case, the shift count is always incremented at block 2340 and a test is made at decision block 2345 to see if the number of bits shifted is equal to the number of non-zero columns at decision block 2345. If not, the entire scan line is shifted one bit to the left at block 2350 and the loop iterates back to decision block 2330. If the number of bits shifted equals the number of non-zero mask columns at decision block 2345, the shift count is cleared at block 2355 and the scan line pointer is decremented at block 2360 to examine the next scan line. If the number of scan lines examined equals the number of non-zero mask scan lines at decision block 2365, then all scan lines under the mask have been tested and the subroutine returns the total number of non-zero bits counted at block 2375. Otherwise, the scan line count is incremented at block 2370 and the outer loop iterates to the top of the inner loop at decision block 2330. In this manner, all non-zero bits in the pointer shape are counted and returned to the calling routine.

Figure 23:
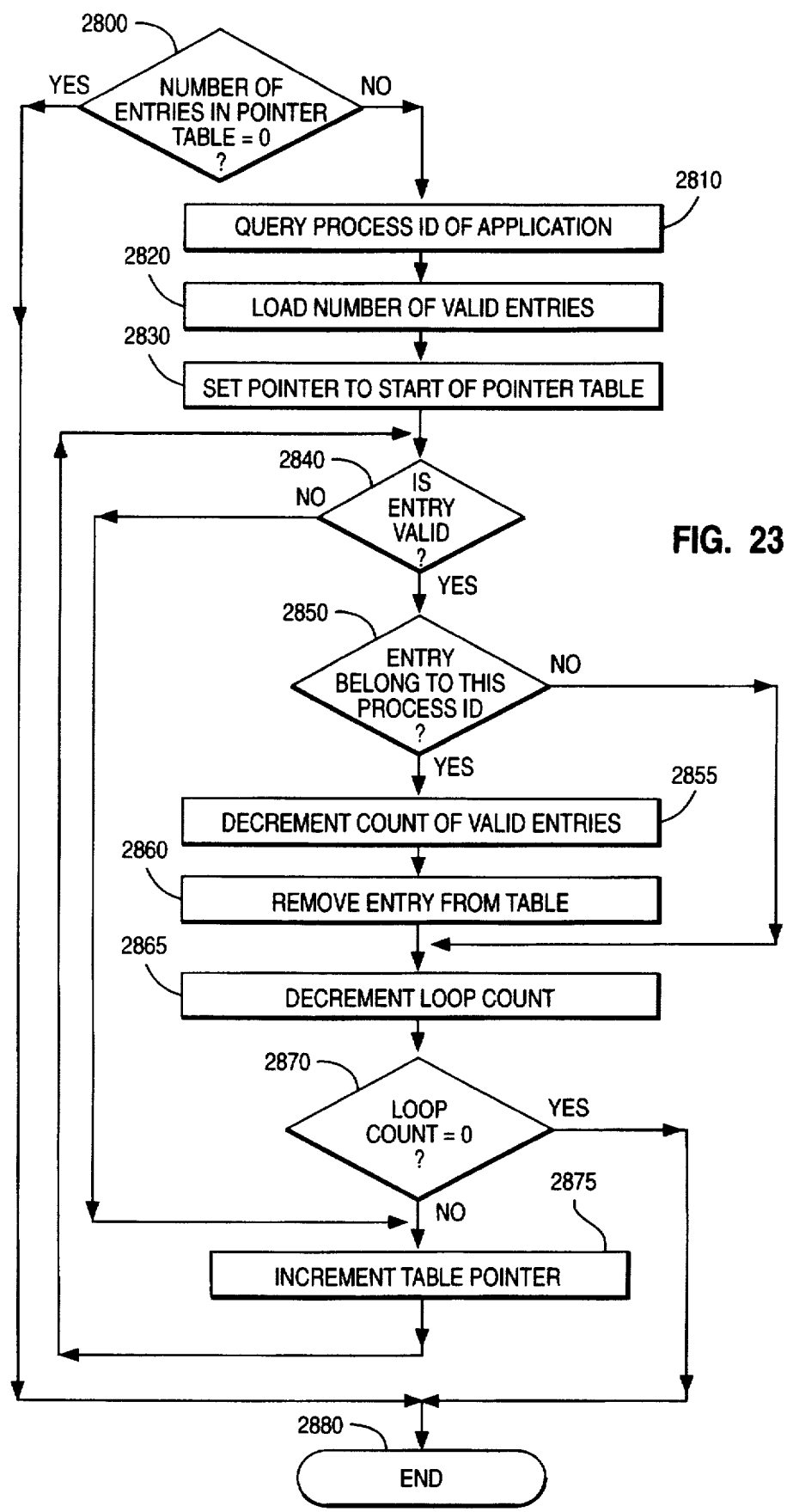
FIG. 23 is a flow diagram of pointer entries being removed from the pointer table whenever an application is shut down.

As previously stated, the count of valid pointer table 1400 entries is carefully maintained. Entries are added to the table whenever a new application supplied pointer ID is discovered while processing mouse movement. FIG. 23 shows how the table is further maintained so that entries get removed when no longer needed. The routine in FIG. 23 gets called each time the operating system closes or shuts down an application. At entry, a check is made at decision block 2800 to see if any entries exists. If not, there is nothing to clean up and the routine ends at block 2880. If the table is not empty at decision block 2800, the process ID of the application being shut down is queried at block 2810. The number of valid entries is loaded at block 2820 and the table pointer is set to the first entry in pointer table 1400 at block 2830. A loop is then entered at decision block 2840 wherein each entry is tested to see if it is valid. If it is valid, the entry is tested at decision block to see if it belongs to the application being shut down. If so, the count of valid entries is decremented at block 2855 and the entry is removed from the table at block 2860. Regardless of the outcome of the test at decision 2850, the loop count is decremented at block 2865 and tested for zero 2870 at block. If not zero, there are still some valid entries in pointer table 1400 so the table pointer is incremented at block 2875 and the loop iterates back to decision block 2840. If a non-valid table entry is found at decision block 2840, the entry is ignored and the table pointer is incremented at block 2875 and again the loop iterates. Eventually, all valid entries are found and when the loop count goes to zero at block 2870, the loop exits and the routine ends at block 2880. Although pointer table 1400 is constructed to contain 250 entries, only a minimum number of entries are examined in most practical cases.

Figure 24:
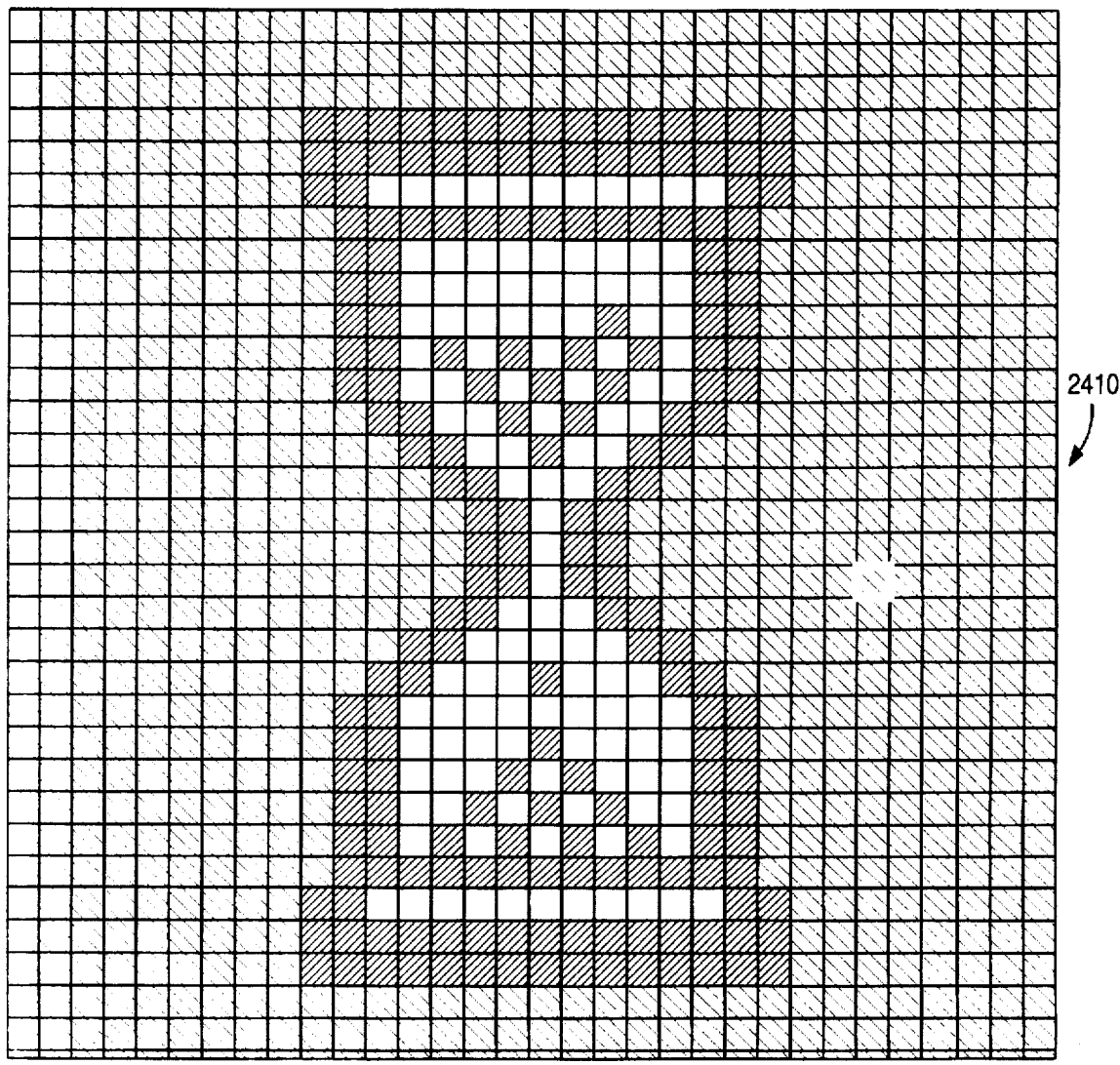
FIG. 24 is a pictorial representation of the Windows (TM) hour glass 'application busy' pointer shape.

Referring to FIG. 24, there is illustrated the bitmap 2410 for the Windows™ hour glass pointer. Upon examining the hour glass pointer shape in FIG. 24, it can be observed that the hour glass is a 'thin waisted' shape and in order for a mask to be effective, it too would have to have a thin waist. The wider the waist of the mask, the more rectangular the shape would become, resulting in a decrease of recognition accuracy. Also, as can be seen in FIGS. 26A and 26B, a misalignment of a the mask with the pointer shape can result in failure to recognize an hour glass pointer shape. FIG. 26A illustrates a bit array 2610 for a fine shape mask to an hour glass pointer, and FIG. 26B illustrates a bit array for an hour glass pointer 2620. Hour glass shape 2620 is still recognizable as an hour glass, but it is short and therefore has a low waist, as indicated at scan line midpoint 2630. Therefore, the wide top of hour glass pointer 2620 coincides with the waist, indicated at scan line midpoint 2640, of the mask of mask 2610 which would cause the recognition algorithm to fail due to non-zero bits outside the mask.

Figure 28:
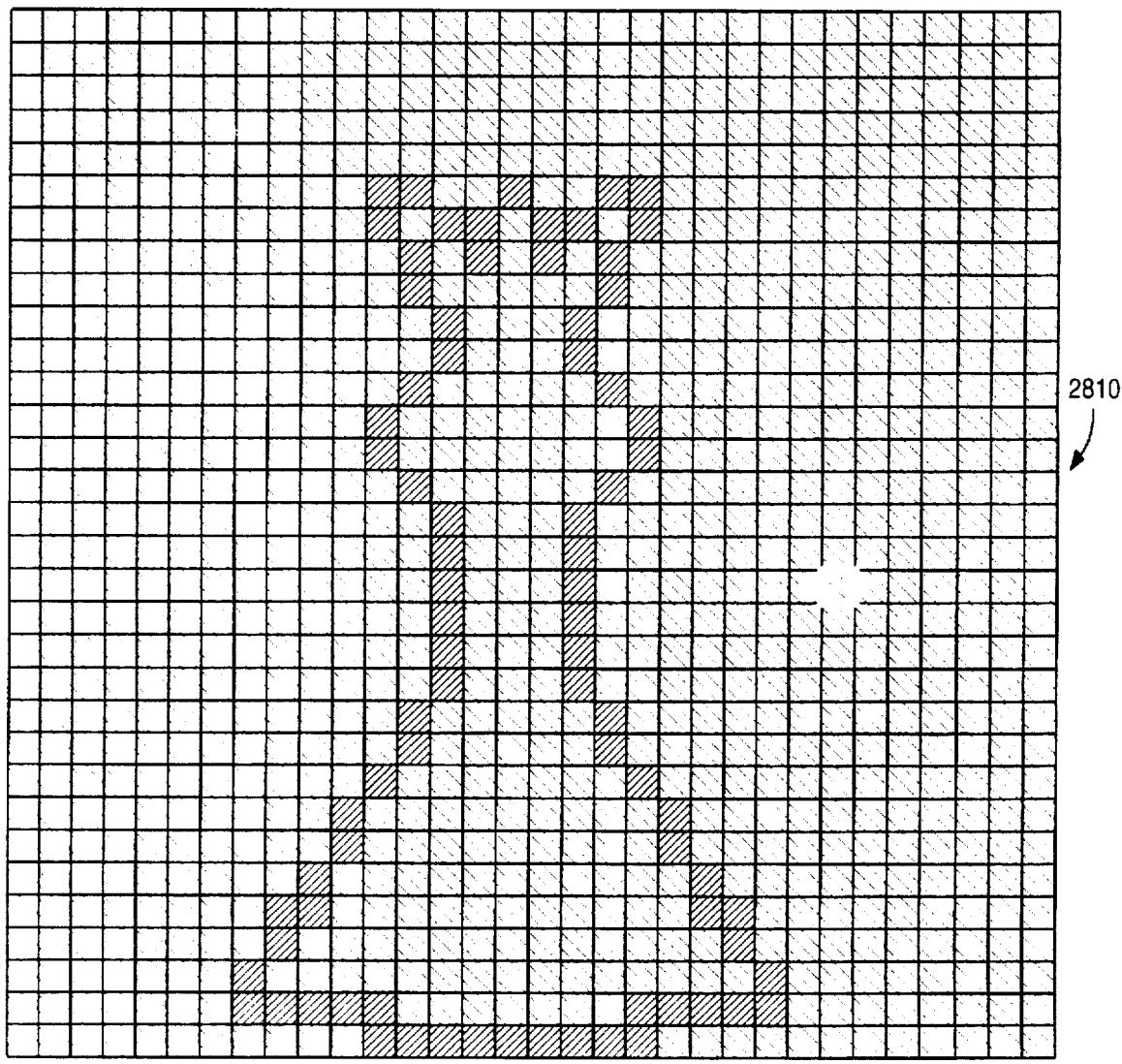
FIG. 28 illustrates the queen pointer shape in the Chess program application.

A potential problem with shape masks is that as they get larger, such as the hour glass mask in FIG. 26B, the greater the likelihood that some non-hour glass shape will fall under the mask. Although a high bit count threshold, on the order of one hundred fifty, might provide effective filtering, it is not necessarily effective in all cases. As unusual as the hour glass shape is, and even with a high bit threshold, some other shapes, for example the queen pointer shape of bitmap 2810 of FIG. 28, would pass both tests. Mistaking the queen pointer for a busy application would cause serious usability problems.

To account for these problems, the second embodiment employs a modified, albeit slightly longer, algorithm that uses a course 2510 and a fine mask 2520, shown in FIGS. 25A and 25B, respectively, and takes pointer image symmetry into account, as shown in FIG. 27.

Referring to FIG. 27, it will be observed that hour glass pointer image 2710 is symmetrical about both its scan line midpoint 2715 and its column midpoint 2720. Scan line midpoint 2715 and column midpoint 2720 divide pointer image 2710 into four quadrants.

Figure 19:
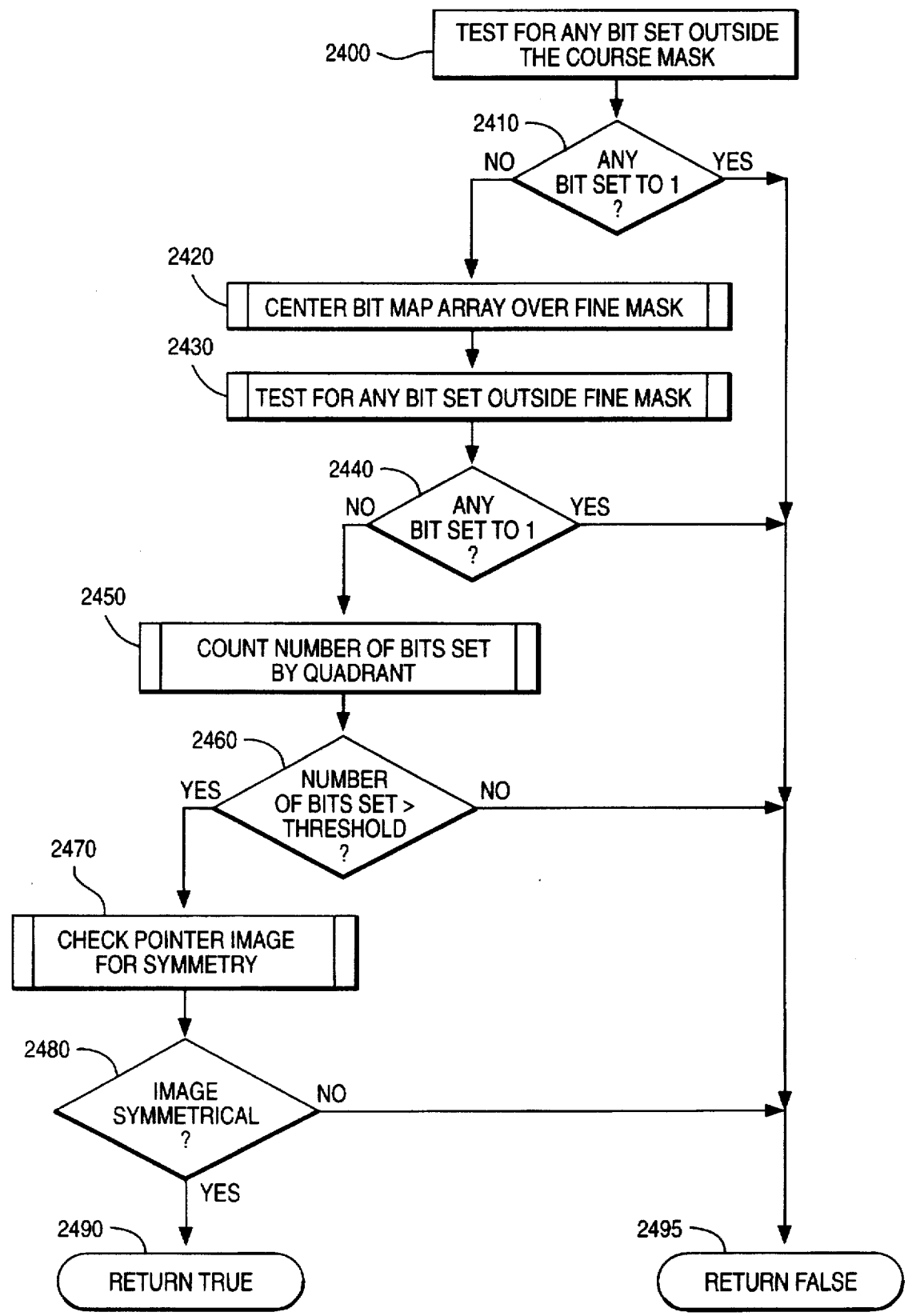
FIGS. 19–22 are flow diagrams of a preferred software implementation of an alternative embodiment of the present invention in which hour glass pointer shape recognition is performed in order to determine when applications are in a busy or unavailable state.

FIG. 19 shows the slightly modified logic of the second embodiment of the present invention. Upon entry to FIG. 19, the pointer shape has already been left and bottom justified and at block 2400 a test for any non-zero bit outside the course mask in made. The course mask is designed to eliminate a high percentage of non-hour glass pointers while permitting considerable license in the design of the hour glass. If any bit is set outside the course mask at decision block 2410, processing is halted and false is returned at block 2495. If no bits are set at decision block 2410, the pointer shape is centered over the fine mask block 2420.

Figure 20:
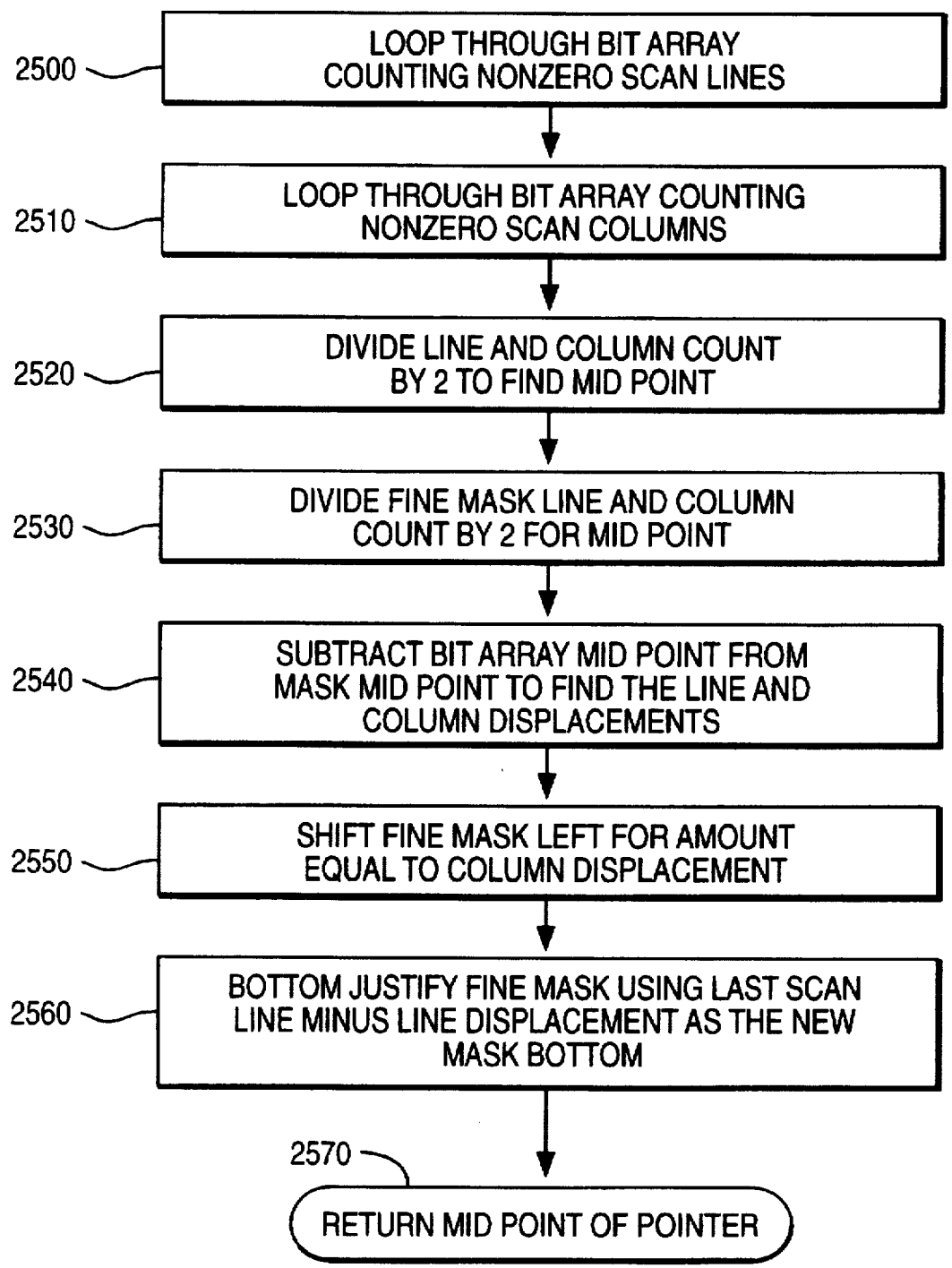

FIG. 20 demonstrates the flow of the centering technique in order to eliminate the problem of scan line mismatches illustrated in FIGS. 26A and 26B. Two loops are entered in which the system counts the number of non-zero pointer scan lines at block 2500 and the number of non-zero pointer columns at block 2510. The resultant non-zero scan line and column counts are divided by 2 to calculate the midpoint of the pointer shape at block 2520. The midpoint of the fine shape mask is also calculated by taking those two known constants and dividing by 2 at block 2530. Then to find the difference between the two midpoints of the two comparands, the midpoint X and Y of the pointer shape is subtracted from the midpoint X and Y of the fine mask at block 2540. Note that the calculated X and Y displacements may be zero or a positive number, but may never be negative since the pointer shape cannot be larger than the fine mask.

Once the column (X) and the scan line (Y) displacement are known, the fine mask is left justified an amount equal to the column displacement at block 2550 and bottom justified an amount equal to the scan line displacement at block 2560. The net effect of these operations is to superimpose the midpoint of the fine mask over the midpoint of the pointer shape. The superimposition of the pointer shape and the fine mask permits the mask to have a smaller and more tightly contoured silhouette, thereby increasing recognition accuracy. The routine returns to the caller in at block 2570 passing the midpoint of the pointer to be used in the test for symmetry.

Figure 22A:
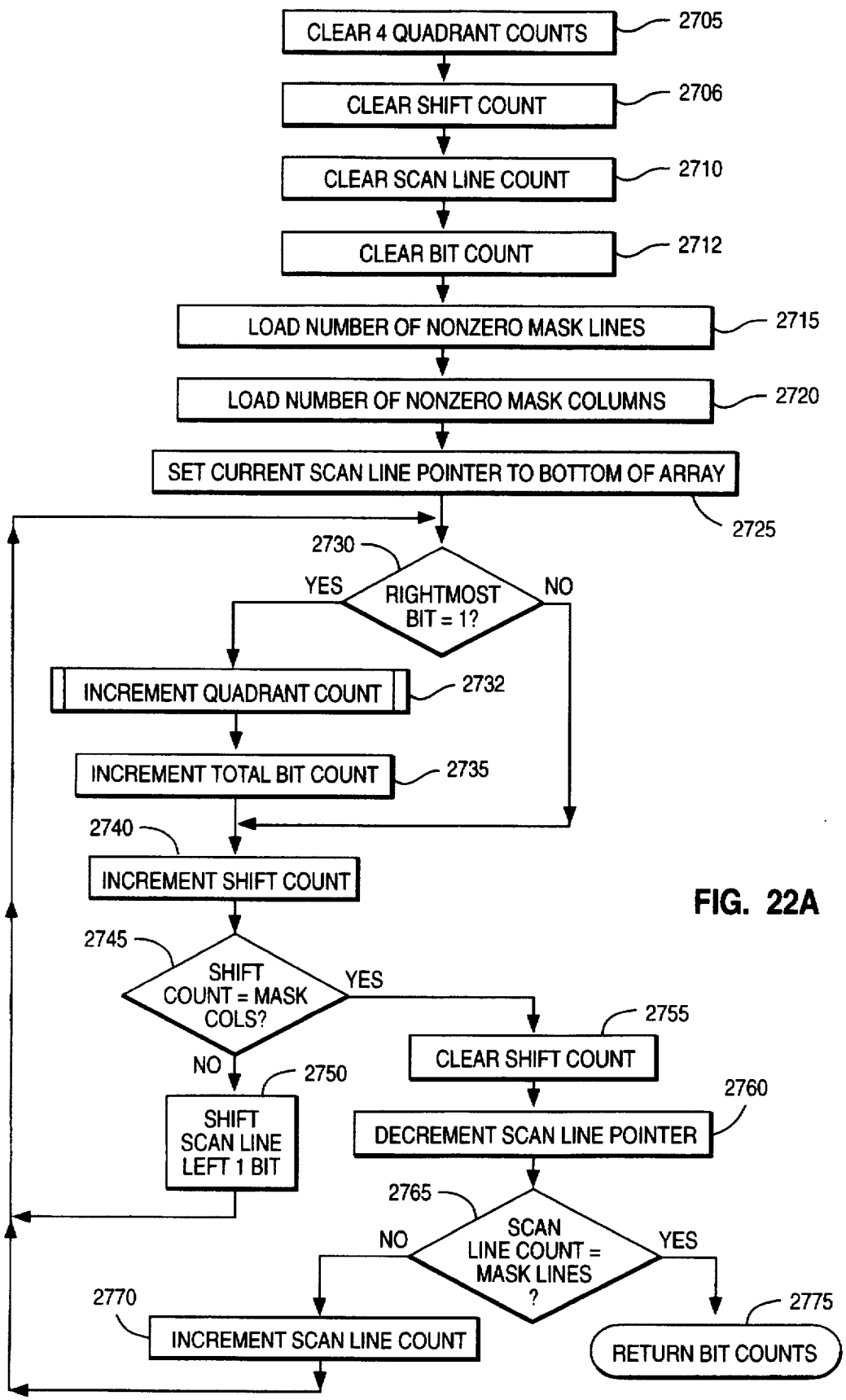

Referring again to FIG. 19, at block 2450 the system calls a subroutine to count the bits set under the fine mask by quadrant. FIG. 27 shows the order of the quadrants that share the midpoint of the pointer image as an origin. FIG. 22A is the subroutine that counts the bit under the fine mask by quadrant. The subroutine of FIG. 22A is identical to the previously described subroutine of FIG. 18 of the first embodiment that counts the bits under the mask, with the exception a separate bit counter is maintained for each quadrant. At block 2705, all 4 quadrant bit counters are cleared. Bit counting commences as in FIG. 18 by means of an inner and outer loop, however as non-zero bit are detected at decision block 2730, a subroutine is called at block 2732 to increment the quadrant count.

Figure 22B:
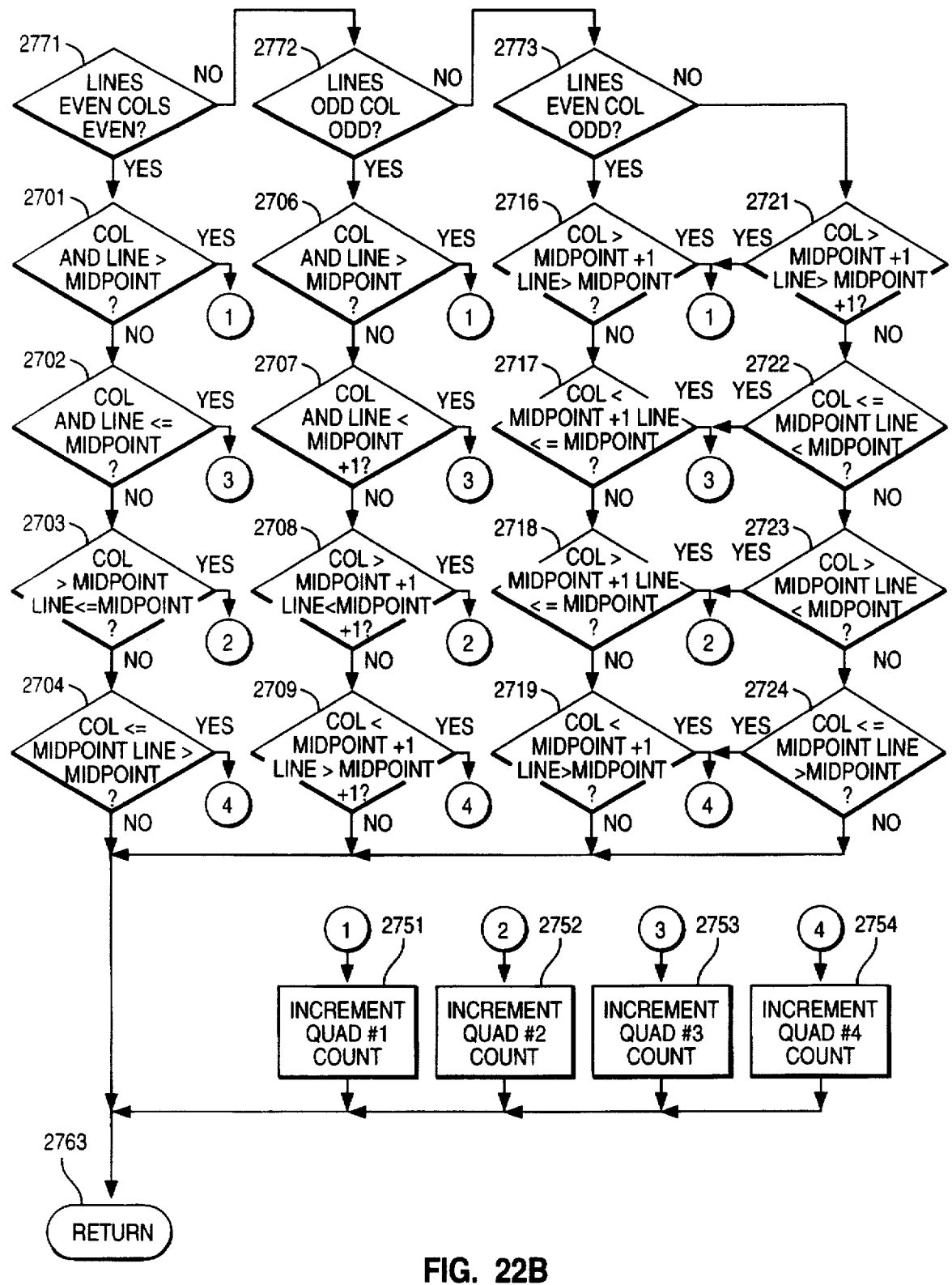

FIG. 22B shows the logic flow of determining in which quadrant a bit is located. At entry to the subroutine, three tests are made at decision blocks 2771, 2772, and 2773 to see if the column count and the scan line count are odd or even. In order to test for symmetry, the image must be divided into symmetrical halves and if there are an odd number of columns or scan lines, the center column or scan line must be ignored since it is the axis of symmetry. In the case of an even number of columns or scan lines, the actual line of symmetry falls between the two columns or rows and the computed midpoint column and row become part of quadrants 3 and 4, or 3 and 2, respectively. After establishing the relationship of the column and scan line counts, operations 2701–2704, 2706–2709, 2716–2719 and 2721–2724 act as sieves to determine in which quadrant the newly found bit falls. In the case of an odd column or scan line count, bits found on the axis of symmetry are not counted and logic simply returns at block 2763. Operations 2751–2754 increment the appropriate quadrant count and the subroutine returns at block 2763.

Upon return from the subroutine of FIG. 22B, the total number of non-zero bits is incremented at block 2735 of FIG. 22A. When all scan lines have been examined at decision block 2765, the outer loop exits and all bit counts get returned at block 2775 to the calling routine.

Referring again to FIG. 19, the testing of the bit count at decision block 2560 uses a threshold appropriate for the hour glass shape, empirically set at one hundred fifty bits. If the test fails, a negative result is returned at block 2495. Else, the pointer image is checked for symmetry at block 2470.

Figure 21:
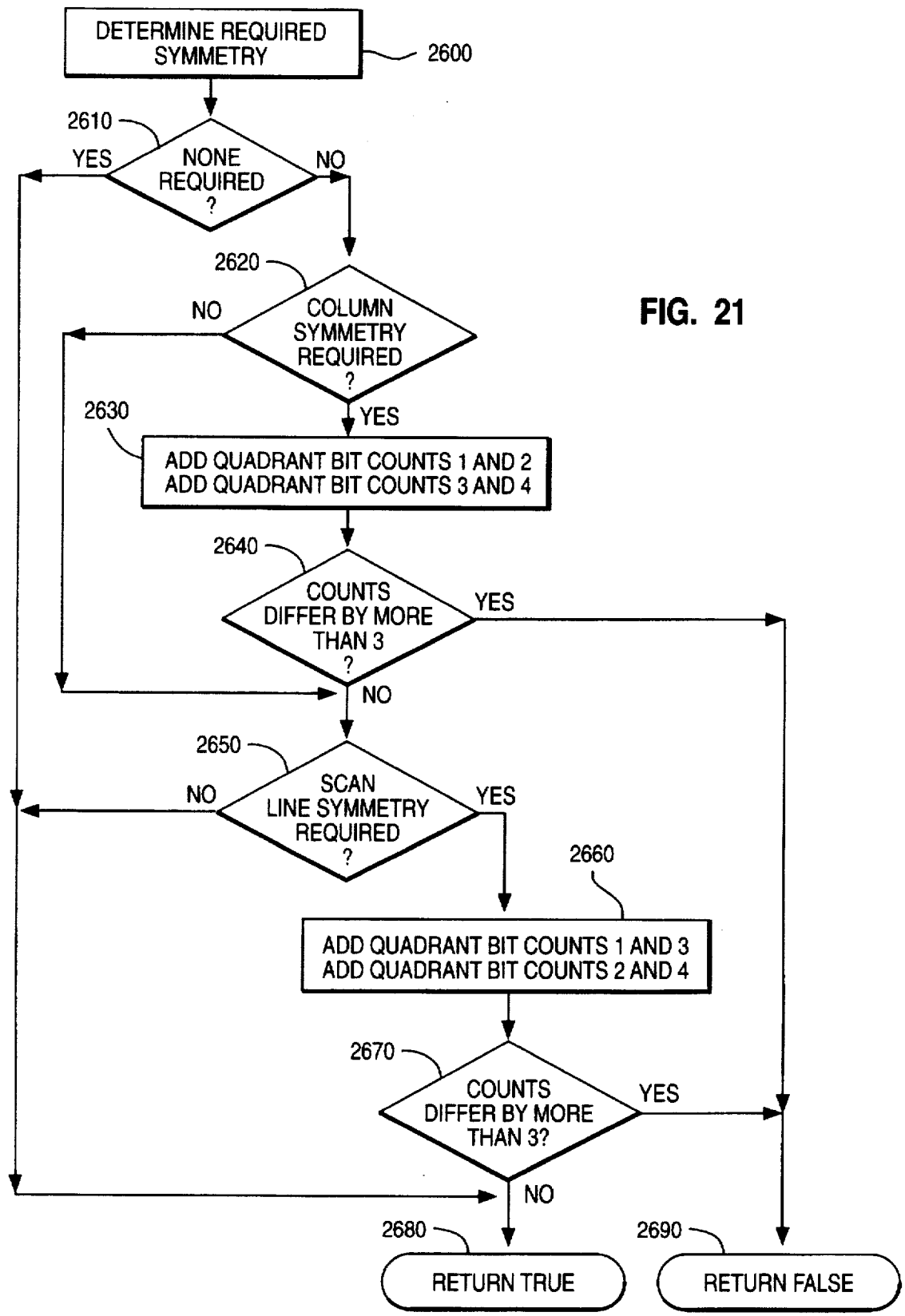

FIG. 21 charts the logic flow of the symmetry checking subroutine. At block 2600 the fine shape mask for the hour glass of FIG. 25B is queried to determine if any symmetry checks are required for this particular pointer shape. If no checks are required at decision block 2610, the system simply returns to the caller a positive indication for symmetry at block 2680. In the case of the hour glass, both column and scan line symmetry are required so the operation at decision block 2620 tests true and the logic falls through to block 2630 where the columns bit counts on each side the column symmetry line are added together. These two counts are compared and if they differ by more than three pels at decision block 2640, the two sides are considered asymmetrical and the subroutine returns a negative indication at block 2690. Else, a check is made to see if scan line symmetry must also be checked at decision block 2650. If not, the subroutine exits with a positive return at block 2680. Otherwise, operation 2660 is executed wherein the quadrant bit counts on each side of the scan line symmetry line are added. If these two counts differ by more than three bits at decision block 2670, the pointer is considered to be asymmetrical in the vertical axis and a negative result is returned at block 2690. Else, the subroutine returns true to the calling routine at block 2680. If the queen pointer FIG. 28 was being tested, it would fail the test for symmetry in the horizontal axis.

Referring again to FIG. 19, processing the return of called subroutine, a test is made for the required symmetry at decision block 2480 and a true or false indication is returned accordingly, at blocks 2490 or 2495, respectively.

This modification incurs a slight performance penalty from having to process a second mask, superimposing the two images and checking symmetry, however the penalty is mitigated by the increased reliability of the recognition algorithm. The penalty is further mitigated by having the symmetry check be conditional by pointer type.

From the foregoing, it may be seen that the present invention is well adapted to accomplish the recognition of pointer shapes. Given that the text pointer shape must approximate a shape of an I-beam, the invention examines the bitmap of the pointer for the purpose of performing optical recognition to determine if the pointer shape has the visual appearance of an I-beam. The pointer shape is tested against a mask of an I-beam that permits a good amount of variation in I-beam size, shape and features while rejecting any shape that is not a reasonable facsimile of an I-beam.

The invention takes into consideration many variables. For example, multiple display resolutions, e.g., VGA, SVGA and XGA resolution display drivers, may each have different pointer bitmap sizes (e.g. 32×32, 40×40). The difference in pointer resolution is made transparent to the recognition algorithm by selecting a shape mask based on pointer size. The invention is unaffected by the use of color in a mouse pointer. Variation in color is ignored and the pointer is treated as if it were monochrome.

A pointer shape is not a standard bitmap. A pointer bitmap actually consists of two masks, the XOR and the AND mask, along with an array of color index values that combine to produce a pointer shape image that is transparent except for the desired pointer shape. The pointer shape maybe coded into either the XOR or AND mask or both. The XOR mask is normally zeroes and the shape is encoded by converting zero bits to one bits. Conversely, the AND mask is normally all ones and gets converted to zeroes to encode the shape.

The 32×32 pel pointer shape contains 1024 pels of which 18 or so may be used to define the shape. The designer of the pointer is free to encode the pointer anywhere within the boundary of the bitmap. To circumvent this problem, the invention locates the pointer image within the bitmap and then relocates the image to the bottom left of the bitmap.

The invention allows considerable license for creative I-beam shapes while rejecting non-I-beam shapes with high certainty. To increase accuracy, some pointer shapes may require extra operations in the recognition process where the pointer shape being tested is precisely aligned with a higher resolution mask. And to provide even more stringent filtering, pointer shapes that are symmetrical in either the vertical or horizontal axes or both, the system may search for these symmetries in the pointer shape under test.

Bitmaps are built to accommodate fast transfers at the device driver level. Therefore the top-leftmost bit ends up as the bottom-leftmost bit in the binary format. In addition, bitmaps are bytes arrays which means that two bits that are contiguous in the image may be separated by 15 bits if they cross a byte boundary. All of this requires significant bit manipulation of the bitmap prior to processing. Two consecutive bits can become discontiguous when treating the bitmap data as 32-bit data instead of 8-bit data. Therefore, the invention reformats the bitmap data from 8-bit to 32-bit alignment.

Pen-based systems have very stringent performance requirements that do not allow computationally intensive operations such as optical recognition on a mouse-move or pen-down event basis for all application defined pointers. The process of classifying application defined pointers as text or non-text pointer shapes is optimized to point of having no discernible effect on system responsiveness or performance.

Although the preferred embodiment of the invention uses optical recognition of the I-beam pointer shape to distinguish text window areas from non-text window areas, the invention may be embodied in any task where the operating system would benefit from knowing, as does the user, the specific state of an application as a pointing device traverses said application. A second embodiment is described that uses recognition of an hour-glass or clock to determine when an application is currently busy and unable to process user input.

Although two specific embodiments have been disclosed, it will be understood by those skilled in the art that changes can be made to these specific embodiments without departing from the spirit and scope of the invention. Furthermore, these embodiments are for the purpose of example and illustration only and are not to be taken to limit the scope of the invention or narrow the scope of the appended claims.

What is claimed is:

1. In a pen-based computer system having a system I-beam pointer having a system I-beam pointer ID, a method of determining that a location of a pointer is capable of accepting character data, said pointer having a pointer ID, said method comprising the computer implemented steps of:

determining whether said pointer ID equals said system I-beam pointer ID;

whenever said pointer ID does not equal said system I-beam pointer ID, determining whether said pointer ID is in a table of pointer IDs and flagged in said table as being an I-beam pointer;

whenever said pointer ID is not in said table of pointer IDs, determining whether said pointer has an I-beam shape; and in response to said pointer ID equaling said system I-beam pointer ID or if said pointer ID is in a table of pointer IDs and flagged in said table as being an I-beam pointer or whenever said pointer has an I-beam shape, changing said pointer to a pen-shaped pointer to indicate computer system acceptance of text input.

2. The method as claimed in claim 1, including the further computer implemented step of:

whenever said pointer is determined to have an I-beam shape, adding said pointer ID to said table of pointer IDs and flagging said pointer ID as being an I-beam pointer.

3. The method as claimed in claim 1, wherein said step of determining whether said pointer has an I-beam shape includes the computer implemented step of:

comparing said pointer to a predefined I-beam pointer-shaped mask.

4. The method as claimed in claim 3, wherein said step of determining whether said pointer has an I-beam shape includes the further computer implemented step of:

whenever all picture elements of said pointer lie within said I-beam pointer-shaped mask, counting the number of picture elements comprising said pointer.

5. The method as claimed in claim 4, including the further computer implemented step of:

whenever the number of picture elements comprising said pointer is greater than a predetermined threshold, changing said pointer to a pen-shaped pointer.

6. The method as claimed in claim 3, wherein said pointer is in a bit map and said method includes the computer implemented step of:

converting said bit map from 8-bit to 32-bit alignment.

7. The method as claimed in claim 3, wherein said pointer is in a bit map and said method includes the computer implemented steps of:

left-justifying and bottom-justifying said pointer in said bit map.

8. A method of determining that a non-system pointer is equivalent to a system pointer, said non-system pointer having a pointer ID, said method comprising the computer implemented steps of:

determining whether said pointer ID is in a table of pointer IDs and flagged in said table as being equivalent to said system pointer; and, whenever said pointer ID is not in said table pointer IDs, determining, based on the shape of said non-system pointer, whether said non-system pointer is equivalent to said system pointer.

9. The method as claimed in claim 8, including the further computer implemented step of:

whenever said non-system pointer is determined, based on shape, to be equivalent to said system pointer, adding said pointer ID to said table of pointer IDs and flagging said pointer ID as being equivalent to said system pointer.

10. The method as claimed in claim 8, wherein said step of determining, based on shape, whether said non-system pointer is equivalent to said system pointer includes the computer implemented step of:

comparing said non-system pointer to a predefined mask.

11. The method as claimed in claim 10, wherein said step of determining, based on shape, whether said non-system pointer is equivalent to said system pointer includes the further computer implemented step of:

whenever all picture elements of said non-system pointer lie within said mask, counting the number of picture elements comprising said non-system pointer.

12. The method as claimed in claim 11, wherein said step of determining, based on shape, whether said non-system pointer is equivalent to said system pointer includes the further computer implemented step of:

whenever the number of picture elements comprising said non-system pointer is greater than a predetermined threshold, determining whether said non-system pointer satisfies a predetermined symmetry condition.

13. The method as claimed in claim 8, wherein said step of determining, based on shape, whether said non-system pointer is equivalent to said system pointer includes the computer implemented step of:

comparing said non-system pointer to a predefined course mask.

14. The method as claimed in claim 13, wherein said step of determining, based on shape, whether said non-system pointer is equivalent to said system pointer includes the computer implemented step of:

whenever all picture elements of said non-system pointer lie within said course mask, comparing said non-system pointer to a predefined fine mask.

15. The method as claimed in claim 14, wherein said step of determining, based on shape, whether said non-system pointer is equivalent to said system pointer includes the further computer implemented step of:

whenever all picture elements of said non-system pointer lie within said fine mask, counting the number of picture elements comprising said non-system pointer.

16. The method as claimed in claim 15, wherein said step of determining, based on shape, whether said non-system pointer is equivalent to said system pointer includes the further computer implemented step of:

whenever the number of picture elements comprising said non-system pointer is greater than a predetermined threshold, determining whether said non-system pointer satisfies a predetermined symmetry condition.

17. The method as claimed in claim 8, wherein said non-system pointer is an hour glass pointer.

18. The method as claimed in claim 8, wherein said non-system pointer is an I-beam pointer.

19. In a pen-based computer system having a display and system I-beam pointer displayable on said display, said system I-beam pointer having a system I-beam pointer ID, a system for determining that a location on said display indicated by a pointer is capable of accepting character data, said pointer having a pointer ID, said system comprising:

means for determining whether said pointer ID equals said system I-beam pointer ID;

means for determining, whenever said pointer ID does not equal said system I-beam pointer ID, whether said pointer ID is in a table of pointer IDs and flagged in said table as being an I-beam pointer; and, means for determining, whenever said pointer ID is not in said table pointer IDs, whether said pointer has an I-beam shape.

20. The system as claimed in claim 19, further comprising:

means for adding, whenever said pointer is determined to have an I-beam shape, said pointer ID to said table of pointer IDs and flagging said pointer ID as being an I-beam pointer.

21. The system as claimed in claim 19, wherein means for determining whether said pointer has an I-beam shape includes:

means for comparing said pointer to a predefined I-beam pointer-shaped mask.

22. The system as claimed in claim 21, wherein said means for determining whether said pointer has an I-beam shape further includes:

means for counting, whenever all picture elements of said pointer lie within said I-beam pointer-shaped mask, the number of picture elements comprising said pointer.

23. In a computer system having a display, a system for determining that a non-system pointer is equivalent to a system pointer, said non-system pointer having a pointer ID, said system comprising:

means for determining whether said pointer ID is in a table of pointer IDs and flagged in said table as being equivalent to said system pointer; and, means for determining, whenever said pointer ID is not in said table pointer IDs, based on the shape of said non-system pointer, whether said non-system pointer is equivalent to said system pointer.

24. The system as claimed in claim 23, including:

means for adding, whenever said non-system pointer is determined, based on shape, to be equivalent to said system pointer, said pointer ID to said table of pointer IDs and flagging said pointer ID as being equivalent to said system pointer.

25. The system as claimed in claim 23, wherein said means for determining, based on shape, whether said non-system pointer is equivalent to said system pointer includes:

means for comparing said non-system pointer to a predefined mask.

26. The system as claimed in claim 25, wherein said means for determining, based on shape, whether said non-system pointer is equivalent to said system pointer includes:

means for counting, whenever all picture elements of said non-system pointer lie within said mask, the number of picture elements comprising said non-system pointer.

27. The method as claimed in claim 26, wherein said means for determining, based on shape, whether said non-system pointer is equivalent to said system pointer includes:

means for determining, whenever the number of picture elements comprising said non-system pointer is greater than a predetermined threshold, whether said non-system pointer satisfies a predetermined symmetry condition.

28. The system as claimed in claim 23, wherein said means for determining, based on shape, whether said non-system pointer is equivalent to said system pointer includes:

means for comparing said non-system pointer to a predefined course mask.

29. The system as claimed in claim 28, wherein said means for determining, based on shape, whether said non-system pointer is equivalent to said system pointer includes the computer implemented step of:

means for comparing, whenever all picture elements of said non-system pointer lie within said course mask, said non-system pointer to a predefined fine mask.

30. The system as claimed in claim 29, wherein said means for determining, based on shape, whether said non-system pointer is equivalent to said system pointer includes:

means for counting, whenever all picture elements of said non-system pointer lie within said fine mask, the number of picture elements comprising said non-system pointer.

31. The system as claimed in claim 30, wherein said means for determining, based on shape, whether said non-system pointer is equivalent to said system pointer includes:

means for determining, whenever the number of picture elements comprising said non-system pointer is greater than a predetermined threshold, whether said non-system pointer satisfies a predetermined symmetry condition.

32. The method system as claimed in claim 23, wherein said non-system pointer is an hour glass pointer.

33. The method as claimed in claim 23, wherein said non-system pointer is an I-beam pointer.

* * * * *

UNITED STATES PATENT AND TRADEMARK OFFICE
CERTIFICATE OF CORRECTION

PATENT NO. : 5,898,422
DATED : Apr. 27, 1999
INVENTOR(S) : Zetts

It is certified that error appears in the above-identified patent and that said Letters Patent is hereby corrected as shown below:

In col. 16 (Claim 32), please delete "method" from the first line.

In col. 16 (Claim 33), please delete "method" from the first line, and insert -- "system" --.

Signed and Sealed this

Seventh Day of December, 1999

*Attest:*

Q. TODD DICKINSON

*Attesting Officer*         *Acting Commissioner of Patents and Trademarks*